United States Patent
Parikh et al.

(10) Patent No.: US 10,706,232 B2
(45) Date of Patent: *Jul. 7, 2020

(54) SYSTEMS, METHODS, AND APPARATUS FOR LINGUISTIC ANALYSIS AND DISABLING OF STORAGE

(71) Applicant: FairWords, Inc., Boulder, CO (US)

(72) Inventors: Anish Parikh, Longmont, CO (US);
Evan M. Caron, Houston, TX (US);
Vadim Polosatov, Ulyanovsk (RU);
Emily Priscilla Wing, Los Angeles, CA (US)

(73) Assignee: FairWords, Inc., Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/363,429

(22) Filed: Mar. 25, 2019

(65) Prior Publication Data

US 2019/0220512 A1    Jul. 18, 2019

Related U.S. Application Data

(63) Continuation of application No. 15/640,471, filed on Jul. 1, 2017, now Pat. No. 10,289,678, and a
(Continued)

(51) Int. Cl.
*G06F 13/00* (2006.01)
*G06F 40/274* (2020.01)
(Continued)

(52) U.S. Cl.
CPC .......... *G06F 40/274* (2020.01); *G06F 40/205* (2020.01); *G06F 40/30* (2020.01);
(Continued)

(58) Field of Classification Search
CPC .......... G06F 13/00; G06F 13/10; G06F 17/21; G06F 17/27; G06F 17/271; G06F 17/274; G06F 17/276; G06F 17/277; G06F 17/2705; G06F 17/2755; G06F 17/2785; G06F 40/30; G06F 40/205; G06F 40/274; G06Q 10/107; H04L 12/58; H04L 12/581; H04L 12/585; H04L 12/5855; H04L 29/08;
(Continued)

(56) References Cited

U.S. PATENT DOCUMENTS 7,827,165 B2    11/2010    Abernethy, Jr. et al.
7,933,960 B2    4/2011    Chen et al.
(Continued)

OTHER PUBLICATIONS

Salad, Abdullahi Elmi, "Office Action Regarding U.S. Appl. No. 14/572,714", dated Apr. 18, 2018, p. 27, Published in: US.
(Continued)

*Primary Examiner* — Robert B Harrell
(74) *Attorney, Agent, or Firm* — Neugeboren O'Dowd PC

(57) ABSTRACT

This disclosure describes systems, methods, and apparatus that monitor any manifestation of an idea, such as typed, written, or verbal message or document creation (e.g., while a user types an email or instant message, or makes a phone call) and analyze the manifestation in real-time to extract a sentiment and based on this sentiment, determine if the idea(s) manifested in the message, document, or other medium poses a risk of violating compliance, policy, or law.

22 Claims, 30 Drawing Sheets

Related U.S. Application Data continuation-in-part of application No. 15/005,132, filed on Jan. 25, 2016, now Pat. No. 10,120,859, and a continuation-in-part of application No. 14/572,714, filed on Dec. 16, 2014, now Pat. No. 10,305,831.

(60) Provisional application No. 62/357,925, filed on Jul. 1, 2016, provisional application No. 62/107,237, filed on Jan. 23, 2015, provisional application No. 61/916,563, filed on Dec. 16, 2013.

(51) Int. Cl.
| | | |
|---|---|---|
| *H04L 12/58* | (2006.01) | |
| *H04L 29/08* | (2006.01) | |
| *G06F 40/30* | (2020.01) | |
| *G06F 40/205* | (2020.01) | |

(52) U.S. Cl.
CPC .............. *H04L 29/08* (2013.01); *H04L 51/02* (2013.01); *H04L 51/046* (2013.01); *H04L 51/04* (2013.01); *H04L 67/30* (2013.01)

(58) Field of Classification Search
CPC ......... H04L 51/02; H04L 51/04; H04L 51/12; H04L 51/046; H04L 67/30
USPC .............................................. 704/9; 709/206
See application file for complete search history.

(56) References Cited

U.S. PATENT DOCUMENTS

| | | |
|---|---|---|
| 8,918,466 B2 | 12/2014 | Yu |
| 8,965,752 B2 | 2/2015 | Chalmers et al. |
| 9,235,629 B1 | 1/2016 | Jones et al. |
| 9,852,215 B1 | 12/2017 | Sullivan et al. |
| 10,120,859 B2 | 11/2018 | Parikh et al. |
| 10,289,678 B2 | 5/2019 | Parikh et al. |
| 2004/0193557 A1 | 9/2004 | Olsen |
| 2004/0215449 A1 | 10/2004 | Roy |
| 2007/0282814 A1 | 12/2007 | Gupta |
| 2008/0091408 A1 | 4/2008 | Roulland et al. |
| 2008/0208567 A1 | 8/2008 | Brockett et al. |
| 2009/0006950 A1 | 1/2009 | Gross et al. |
| 2010/0125897 A1 | 5/2010 | Jain et al. |
| 2010/0169769 A1 | 7/2010 | Jimenez et al. |
| 2010/0318318 A1 | 12/2010 | Spiesberger |
| 2010/0318903 A1 | 12/2010 | Ferren |
| 2011/0238979 A1 | 9/2011 | Harp et al. |
| 2012/0078612 A1 | 3/2012 | Kandekar et al. |
| 2012/0079372 A1 | 3/2012 | Kandekar et al. |
| 2012/0179682 A1 | 7/2012 | De Saeger et al. |
| 2012/0191792 A1 | 7/2012 | Chebiyyam |
| 2012/0209751 A1 | 8/2012 | Chen et al. |
| 2012/0297317 A1 | 11/2012 | Radom et al. |
| 2013/0120267 A1 | 5/2013 | Pasquero et al. |
| 2013/0238318 A1 | 9/2013 | Enoki et al. |
| 2013/0253910 A1 | 9/2013 | Turner et al. |
| 2013/0339457 A1 | 12/2013 | Freire et al. |
| 2014/0143268 A1 | 5/2014 | Finkelstein et al. |
| 2014/0278361 A1 | 9/2014 | Pak et al. |
| 2015/0033283 A1 | 1/2015 | Mulder |
| 2015/0154184 A1 | 6/2015 | Bahgat et al. |
| 2016/0006680 A1 | 1/2016 | Chebiyyam |
| 2016/0063874 A1 | 3/2016 | Czerwinshi et al. |

OTHER PUBLICATIONS

Gruber, Stephen, "Response to Office Action Regarding U.S. Appl. No. 14/572,714", dated Mar. 7, 2018, p. 12, Published in: US.

Gruber, Stephen, "Response to Non-Final Office Action Regarding U.S. Appl. No. 14/572,714", dated Sep. 14, 2018, p. 11, Published in: US.

Salad, Abdullahielmi, "United States Office Action Re U.S. Appl. No. 14/572,714", dated Jan. 3, 2017, p. 24, Published in: US.

Salad, Abdullahielmi, "United States Office Action Re U.S. Appl. No. 14/572,714", dated Sep. 8, 2017, p. 21, Published in: US.

Gruber, Stephen S., "Response to Office Action Re U.S. Appl. No. 14/572,714", dated Jun. 5, 2017, p. 11, Published in: US.

Gruber, Stephen, "Response to Non-Final Office Action Regarding U.S. Appl. No. 15/005,132", dated Feb. 27, 2018, p. 13, Published in: US.

Harrell, Robert B., "United States Office Action Re U.S. Appl. No. 15/005,132", dated Sep. 27, 2017, p. 19, Published in: US.

Harrell, Robert B., "Office Action Regarding U.S. Appl. No. 15/640,471", dated Mar. 22, 2018, p. 21, Published in: US.

Harrell, Robert B, "Ex Part Quayle Action Regarding U.S. Appl. No. 15/640,471", Dec. 31, 2018, p. 8, Published in: US.

Gruber, Stephen S., "Response to Ex Parte Quayle Action Regarding U.S. Appl. No. 15/640,471", Jan. 30, 2019, p. 13, Published in: US.

Gruber, Stephen S., "Response to Office Action Regarding U.S. Appl. No. 15/640,471", dated Sep. 14, 2018, p. 13, Published in: US.

SYSTEMS, METHODS, AND APPARATUS FOR LINGUISTIC ANALYSIS AND DISABLING OF STORAGE

CLAIM OF PRIORITY UNDER 35 U.S.C. § 120

The present Application for Patent claims priority to U.S. patent application Ser. No. 15/640,471, entitled, "LINGUISTIC ANALYSIS AND LEARNING FOR POLICY ENGINE", filed Jul. 1, 2017, and issued as U.S. Pat. No. 10,289,678 on May 14, 2019, which claims priority to U.S. Provisional Application No. 62/357,925, entitled, "LINGUISTIC ANALYSIS AND LEARNING FOR POLICY ENGINE", filed Jul. 1, 2016, which is hereby expressly incorporated by reference herein. This application is also a continuation-in-part of U.S. patent application Ser. No. 15/005,132, entitled, "MESSAGE SENTIMENT ANALYZER AND FEEDBACK", filed Jan. 25, 2016 and issued as U.S. Pat. No. 10,120,859 on Nov. 6, 2018, which claims priority to U.S. Provisional Application No. 62/107,237, entitled, "MESSAGE SENTIMENT ANALYZER AND FEEDBACK", filed Jan. 23, 2015. The present Application for patent is also a continuation-in-part of U.S. patent application Ser. No. 14/572,714, entitled, "COMPLIANCE MECHANISM FOR MESSAGING", filed Dec. 16, 2014 and issued as U.S. Pat. No. 10,305,831 on May 28, 2019, which claims priority to U.S. Provisional Application No. 61/916,563, entitled, "COMPLIANCE MECHANISM FOR MESSAGING", filed Dec. 16, 2013. All of the above are hereby expressly incorporated by reference herein as if presented in their entireties.

FIELD OF THE DISCLOSURE

The present disclosure relates generally to digital message analysis. In particular, but not by way of limitation, the present disclosure relates to systems, methods and apparatuses for determining a sentiment associated with a document and precluding a document from being saved to non-volatile memory when a sentiment of the document poses a risk of a policy, compliance, or legal violation.

DESCRIPTION OF RELATED ART

Email, instant messages, and chat room messages, and phone calls at work can often serve to place liability on companies for communications of their employees, even when those communications are against company policy. For instance, transcripts of non-compliant personal conversations over company email led the board of Boeing to demand the CEO's resignation in 2005. He had led the company well, but as he had sent personal message containing language outside of company policy he was no longer able to serve as an example for the rest of the company. While companies typically employ compliance guidelines to prevent such messages from being sent, such compliance mechanisms typically are ineffective because they require employees to self-police themselves. Some software-based compliance mechanisms exist, but these tend to analyze communications after the fact rather than helping to prevent "bad" communication from being made. There is therefore a need for systems, methods, and apparatus that prevent non-compliant messages from being communicated to a recipient.

SUMMARY OF THE DISCLOSURE

Exemplary embodiments of the present disclosure that are shown in the drawings are summarized below. These and other embodiments are more fully described in the Detailed Description section. It is to be understood, however, that there is no intention to limit the disclosure to the forms described in this Summary of the Disclosure or in the Detailed Description. One skilled in the art can recognize that there are numerous modifications, equivalents and alternative constructions that fall within the spirit and scope of the disclosure as expressed in the claims.

Some aspects of the disclosure can be characterized as a method of precluding ideas that pose a compliance, policy, or legal violation risk from being recorded in non-volatile memory during document creation. The method can include parsing a first document into words and symbols via a parsing module, sequences of words, or words and symbols, being identified as ideas. The method can also include passing the first document to a semantic analyzer. The semantic analyzer can be configured to: access a policy model stored in a policy engine database; access a violation threshold stored in the policy engine database; assign a score to each of the ideas using the policy model; determine that a total of scores for the first document surpasses the violation threshold; disable save functionality of a device creating the first document, the save functionality configured to save the first document to non-volatile memory; and provide the first document or a screenshot of the first document to an analytics dashboard configured to present the first document to a policy reviewer. The method can further include receiving a response from the policy reviewer indicating the policy reviewer's assessment of risk of the total of the scores assigned to the first document. The method can yet further include storing the response in the policy engine database. The method may also include training the policy model, at a training module, using machine learning that uses the response as one of its inputs, to form an updated policy model. The method can include accessing the updated policy model and assign scores to ideas parsed from a second document using the updated policy model.

Other aspects of the disclosure can be characterized as a system for precluding ideas that pose a compliance, policy, or legal violation risk from being recorded in non-volatile memory during document creation. The system can include a parsing module, a policy engine database, an analytics database, a semantic analyzer, and a training module. The parsing module can be configured to receive a first document in real time or via import and parsing the first document into words and symbols, sequences of words, or words and symbols, being identified as ideas. An analytics dashboard can be configured to present the first document, or a screenshot of the first document, to a policy reviewer, and to receive a response from the policy reviewer indicating the policy reviewer's assessment of risk of the total of the scores assigned to the first document. The semantic analyzer can be configured to: receive the words and symbols; access a policy model stored in the policy engine database; access a violation threshold stored in the policy engine database; assign a score to each of the ideas using the policy model; determine that a total of scores for the first document surpasses the violation threshold; disable save functionality of a device creating the first document, the save functionality configured to save the first document to non-volatile memory; and provide the first document or a screenshot of the first document to the analytics dashboard. The training module can be configured to train the policy model using the response from the policy reviewer as one of its inputs, to form an updated policy model.

Yet other aspects of the disclosure can be characterized as non-transitory, tangible computer readable storage medium, encoded with processor readable instructions to perform a method of precluding ideas that pose a compliance, policy, or legal violation risk from being recorded in non-volatile memory during document creation. The method can include parsing a first document into words and symbols via a parsing module, sequences of words, or words and symbols, being identified as ideas. The method can also include passing the first document to a semantic analyzer. The semantic analyzer can be configured to: access a policy model stored in a policy engine database; access a violation threshold stored in the policy engine database; assign a score to each of the ideas using the policy model; determine that a total of scores for the first document surpasses the violation threshold; disable save functionality of a device creating the first document, the save functionality configured to save the first document to non-volatile memory; and provide the first document or a screenshot of the first document to an analytics dashboard configured to present the first document to a policy reviewer. The method can further include receiving a response from the policy reviewer indicating the policy reviewer's assessment of risk of the total of the scores assigned to the first document. The method can yet further include storing the response in the policy engine database. The method may also include training the policy model, at a training module, using machine learning that uses the response as one of its inputs, to form an updated policy model. The method can include accessing the updated policy model and assign scores to ideas parsed from a second document using the updated policy model.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
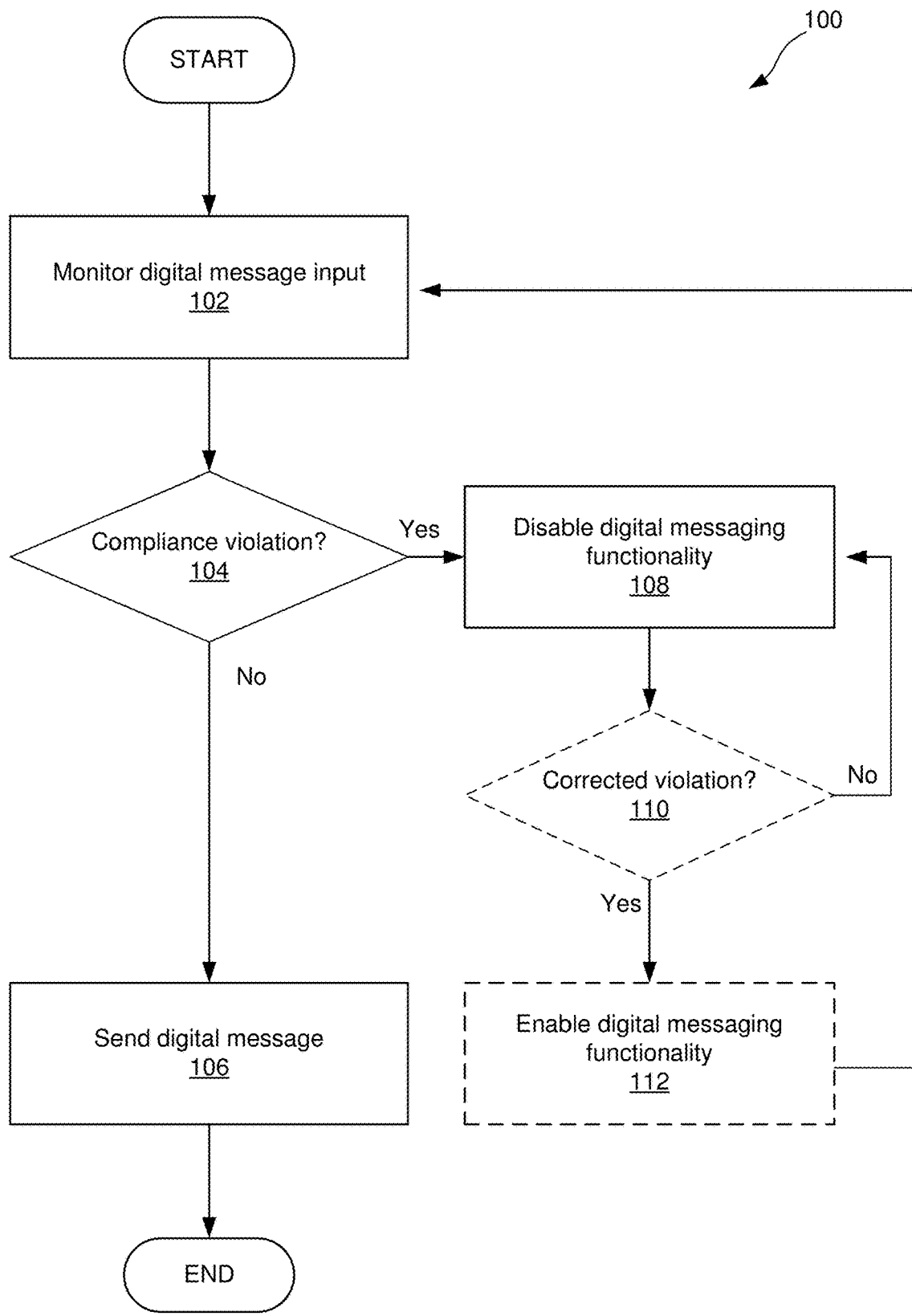
FIG. 1 illustrates a method for disabling functionality of a messaging system before a compliance violation, due to content of a communication, occurs.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

This disclosure describes systems, methods, and apparatus that monitor any manifestation of an idea, such as typed, written, or verbal message or document creation (e.g., while a user types an email or instant message, or makes a phone call) and analyze the manifestation in real-time to extract a sentiment and based on this sentiment, determine if the idea(s) manifested in the message, document, or other medium poses a risk of violating compliance, policy, or law.

Compliance Performance Tracking

In one embodiment, analysis of messages can be in real time and used to identify and disable sending of messages that breach compliance or human resources protocols. The disabling can occur before a compliance or human resources violation occurs (e.g., by disabling the sending of a message from the sending device or otherwise preventing the message from reaching any server external to the sending device). U.S. Patent Application No. 2015/0172243 describes this embodiment in further detail and is incorporated herein by reference.

In some cases it may be desirable to go a step further and track and monitor compliance violations over time and for various persons across an entire corporate entity. In this case, non-compliant messages continue to be identified and their transmission blocked or disabled, but further, each instance where blocking is required is recorded. Over time, the number and quality of non-compliant messages that were blocked can be used to measure and analyze compliance performance including improvement in an organization's understanding of compliance policies as well as efforts to avoid non-compliant messages.

In addition to compliance, these monitoring techniques can be applied to messaging related to harassment, 'isms', hostile workplace environments, and ethics. In other words, the metric can be used to gauge whether a person or a group within a company appears to be engaging in harassing activities regardless of compliance issues. For instance, if a certain number of flagged terms or phrases are found within a set of e-mails or instant messages from a certain employee, then a notification can be sent to human resources to investigate the employee's actions in more detail.

Personality Profiles

Emotional checks, or comparisons to personality profiles, can be used on inbound and outbound messaging (e.g., e-mail) to help employees better communicate by extracting and providing emotional context, including suggestions for responses, based on a personality or sentiment of a recipient.

Existing technologies allow personality profiles to be generated based on analysis of public communications and content that people generate (e.g., NLP Sentiment Technology). For instance, analysis of public FACEBOOK, TWITTER, and LINKEDIN content can be used to create personality profiles for content generators. To simplify the personality profile generation, content creators can be placed into buckets, thus greatly narrowing the number of different personalities available to the analysis. For instance, a personality bucket may include "easy to anger," "gullible," or "compassionate" to name three non-limiting examples. However, personality profiles can also be numeric. For instance, various personality profile tests known to those of skill in the art include vector graphs showing different personalities. Thus, a number or vector can be assigned to a personality profile.

The sources of public content are not limited to FACEBOOK, TWITTER, and LINKEDIN, and can include all sources of public content. For instance, blog posts or comments, and forum submissions, are further examples of public content that can be mined to generate personality profiles for persons who create public content.

These personality profiles can have a number of uses. For one, personality profiles can be used in combination with the above-noted compliance technology. However, instead of messages being blocked as non-compliant, systems, methods, and apparatus can analyze messages to identify words, phrases, sentences, and ideas that can help to create the personality profiles. In this way, public content as well as persons' communications can be used to generate personality profiles.

Typically, persons' messages are not publicly available and thus can't be analyzed. However, there are many contexts where access to such messages is possible. For instance, a customer service staffer receives hundreds of e-mails per day dealing with countless product issues and troubleshooting. Each of these messages can be analyzed and used in combination with an existing personality profile associated with the sender of each message, where the personality profile is initially generated based on public content that the message sender has created. For instance, customer service may receive an e-mail from Tony Stark. Tony Stark may also have a FACEBOOK and TWITTER account and may often make public comments on those platforms that are available for public viewing. A personality profile can be created for Tony Stark based on the public content of his FACEBOOK and TWITTER accounts. When Tony Stark e-mails customer support at VERIZON to complain about dropped calls when he is using his phone and moving at high speeds in his IRON MAN suit, VERIZON servers can search a database of personality profiles for Tony Stark. Upon finding a personality profile, the VERIZON servers can then analyze Tony Stark's e-mail, in a similar manner to the methods used to identify non-compliant messages described above, and then update the personality profile based on information mined from Tony Stark's e-mail. The updated personality profile can then be used to assist customer support in responding to Tony's concerns about dropped calls. This example helps to highlight how personality profiles can be generated and updated using a combination of publicly available content and the content of one or more messages received by an entity having access to an existing personality profile.

Once at least one message (e.g., e-mail) has been received, the updated personality profile can be used to provide useful information to someone responding to the message. For instance, a VERIZON customer support specialist who receives Tony Stark's e-mail may be presented with the updated personality profile. This alone may tell the customer support specialist that Tony is in a personality bucket associated with highly intelligent people and another bucket with people who are unlikely to back down from confrontation. From this, the customer support specialist can deduce that a fluff response to Tony Stark will not make him go away, and instead that a more thorough and reasoned response is required. Thus, this example shows that the updated personality profile can be used by a responder to a message to better tailor his/her response to a sender.

Similarly, a responder's message can be analyzed while it is being created (e.g., typed). A pop up box or other prompt may appear on the responder's display encouraging or suggesting that a different tone or a different message be used, or that the currently-generated message be modified to better suit the personality of the original sender (e.g., Tony Stark). In other cases, further message generation (e.g., typing) may be disabled if the responder's message is found to be too out of sync with a suggested tone or response based on the original sender's personality profile.

Sometimes e-mail and other message responses are automated, for instance, many customer support groups respond with an automated message letting a sender know that their message has been received and will be responded to within 24 to 48 hours. However, these messages tend to be uniform for all senders. The present disclosure envisions automated responses that are selected from a database of responses, each response linked to certain personality profiles. Thus, as messages from different senders are received, and even different senders are found to be in different moods, different automated responses can be sent that are at least partially tailored to the sender's personality and/or mood.

In another embodiment, incoming messages are often routed to different persons within an organization. Updated personality profiles can be used to better route incoming messages to specialists. For instance, incoming messages that are linked to personality profiles of persons that are easy to anger or that are loyal customers as compared to ones that frequently move between service providers of companies, may be routed to more experienced specialists or those with greater authority (e.g., a supervisor). In the case of Tony Stark e-mailing VERIZON, since Tony's personality profile may indicate that he is merely a superhero recently responsible for saving the planet, but not a loyal VERIZON customer, his e-mail can be routed to an offshore call center staffed by mostly inexperienced, underpaid responders, who type one finger at a time. In comparison, an e-mail from a long-time customer known to be challenging to work with can be routed to a manager equipped to handle this more important and challenging communication. As seen, updated personality profiles can be used to route incoming messages to particular persons within an organization.

Another embodiment recognizes that multiple people within an organization sometimes communicate with the same external person without knowing that an internal member of the organization has already communicated with the external person. In this embodiment, an updated personality profile can be generated based on communications that a first member of an organization has had with an external person. For instance, incoming e-mail messages can be mined for data to update the personality profile. When a second member of the organization begins drafting a message to the external person, the updated personality profile on the external person may be presented to the second member of the organization to assist him/her in drafting an appropriate message or one more likely to win the heart and mind of the external person. Again, this can be presented as a profile alone that the second member can use at his/her discretion, or as a prompt that can pop up urging or suggesting certain comments or language for the second member of the organization to use. In some cases, the message may be blocked or further message creation can be disabled if the second member is drafting a message that falls outside of bounds deemed appropriate with the external member. The personality profile and information related thereto can be stored such that even where one person who has communicated with the external person leaves the company, the information regarding the personality and sentiment of the external person stays with the company.

The above embodiments that utilize an updated personality profile can be categorized as "sentiment" check embodiments since they often involve checking a sentiment of an outgoing message based on the sentiment of one or more incoming messages.

In another embodiment, a sentiment preview can be generated for a message before it is read in order to prepare a recipient for the contents.

Metrics Based on Organization-Wide Personality Profile Tracking

The above noted personality profiles can be created and updated for numerous persons within an organization. Over time these profiles can be used to generate overall views of an organization's subjective health. For instance, a happiness, wellness, or productivity of employees on average could be determined by looking at the current or trending profiles for a large number of employees in an organization. Subjective indicators can be extracted for different geographical regions of an organization or for different departments within an organization. Various other analytics can be provided other than the non-limiting examples just noted.

These analytics can be incorporated into employee evaluations for promotions, raises, incentive compensation, and transfers, to name a few. These analytics, since tracked over time, can provide insight into how events at an organization (e.g., company outings, announcements, etc.) have influenced company sentiment.

Names and personal information is not stored or analyzed. Instead, in one embodiment, scores associated with arbitrary identifications of persons can be assigned. An IP address or an encrypted/scrambled version of an e-mail address are two non-limiting examples of arbitrary identifications of persons.

In other cases, analytics can be more granular. Rather than assigning scores to individuals, groups of persons can be placed in "buckets" or categories.

Monetizing Employee Downtime

Yet a further embodiment can allow organizations to monetize the personality profiles and updates thereto that result from analyzing messages sent by employees. In particular, advertising entities currently monitor cookies on devices and therefore can link Internet surfing tendencies with an IP address. Personality profiles can also be associated with an IP address and can be exchanged with an advertising entity for some consideration. Widespread exchange of such data may not be desirable, so one alternative is to only exchange personality profiles with advertising entities when an employee is using the Internet for personal reasons during work hours (i.e., downtime). In this way, advertising entities could gain additional personality information for certain IP addresses and thus better tailor advertisements, but only during periods when users of those IP addresses are using their company resources for non-work purposes.

As noted briefly above, other aspects of this disclosure describe systems, methods, and apparatus that monitor typed, written, or verbal message creation (e.g., while a user types an email or instant message or makes a phone call) and analyze the communication in real-time. Details of such systems, methods, and apparatus are described below with particular attention to a use case where the analysis leads to a determination as to whether a breach of compliance policy or law is likely to result from dissemination of the message. However, it should be understood, that the systems, methods, and apparatus for analyzing the communication can be applied to various use cases and are not limited to compliance policy or legal breaches. Examples of communications envisioned in this application include, but are not limited to: digital messages (e.g., e-mail, text, fax), written messages (e.g., notes and hand-delivered memoranda), and verbal messages (e.g., telephone calls via handset or headset). The systems, methods, and apparatus then disable functionality of the messaging system if a non-compliant (or potentially non-compliant) message is identified. In the case of digital messages this can include disabling a send button in an e-mail, disabling send functionality that is triggered by depression of the "ENTER" key relative to an instant message, and disabling the ability to edit text in the digital message other than the flagged text, to name a few non-limiting examples. Digital messages may include attachments (e.g., attachments to an e-mail or attachments to a text message) that can also be analyzed for non-compliance. Again, where a non-compliant attachment is identified, transmission functionality or other functionality associated with the digital message can be disabled. In some cases, the attachment may even be automatically removed from the digital message and reattachment of the identical attachment may be precluded.

In the case of written messages a message auditing device can be used to analyze physical messages and provide a warning if the message is flagged as having non-compliant content. For instance, a device can take image samples of a written message as it is being written (or typed on a typewriter) or once the message has been completed. Image analysis software can convert the image into digital text via optical character recognition or other image analysis software. The digital text can then be analyzed to determine if non-compliant text or a non-compliant idea exists in the message. If non-compliant text or a non-compliant idea is flagged, then the user or sender can be notified of the potential offense, for instance via an audible or visual indicator. In one example, where a written or typed or printed message is to be transmitted via fax or similar technology, the fax machine or scanner can be disabled when non-compliant text or a non-compliant idea is flagged in a hardcopy of the message.

In the case of verbal messages a device can listen to the verbal message, analyze the words and content, determine if the verbal message includes non-compliant words or ideas, and provide a signal to the user of the non-compliance threat, or disable functionality of a device intended for transmission of the verbal message to a recipient. For instance, a cell phone handset or a Bluetooth headset for a mobile or landline telephone, to name two examples, could analyze verbal messages to be transmitted through these devices, delay the transmission long enough to enable the analysis to take place, and then disable transmission of the verbal message if a non-compliant message or idea is identified. In some cases, the listener may hear silence where the speaker said non-compliant words or the listener may hear a beep or other sound instead of the non-compliant words that the speaker intended the recipient to hear. The device may also notify the speaker that non-compliant words have been identified, and/or prevented from being heard by the listener. A headset may beep or vibrate to indicate to the speaker that a non-compliant message was detected and that said message was not conveyed to the listener. In embodiments where a hardcopy communication is scanned, faxed, or otherwise converted from a hardcopy to a digital form, the scanning device can include mechanisms to analyze the message and flag non-compliant text or ideas and then disable transmission or long term storage functionality. In the case of typed messages on a mechanical device such as a typewriter, keystrokes can be electronically monitored or visually monitored via a camera and analysis software.

In some embodiments, text or messages can be identified before completion of the drafting or verbal disclosure of a text or message. For instance, where a message is being typed or written, words can be identified before typing or writing of the word is complete. As one example where "bribe" is a word that can be flagged, and a user types or writes the letters, "brib", the systems and methods may flag this entry as a potential violation and disable messaging functionality before the user can even complete typing or writing the word. While it is possible that the user was attempting to enter a phrase like, "bribery is not good for the bottom line," which might not be in violation, this feature can be employed as an extra caution against certain words in addition to the typical functionality that flags complete words and messages. As another example, the partial message "fix the labor r" may be flagged, and messaging functionality disabled, before the user can complete the sentence.

In some cases, the portion of the word or message that has been drafted can be deleted, converted to blank spaces, or converted to symbols. For instance, the letters, "brib" may be converted to "XXXX" or "####." The partial sentence "fix the labor r" can be converted to "fix the _____". As seen, portions or an entire message can be converted to symbols or blanks or can be deleted.

Similarly, and in the case of verbal dictation of messages, flagged words may not be rendered on a screen or may be rendered using blanks or symbols as described above. In this way, while flagged words or messages may be spoken into a dictation device, the flagged words or messages are precluded from being added to the message in a computing device's short term memory and precluded from viewing on a display.

In all of the examples and embodiments of this disclosure, when a non-compliant message is flagged, a signal or message can be transmitted to a compliance officer. In other embodiments, reports can be generated and provided to a compliance officer indicating results of blocked, non-blocked, and flagged messages. In some instances, where communication via a digital device does not occur, and hence there is no automated mechanism for precluding the transmission of a non-compliant message, a message may be sent to a compliance officer so that the compliance officer can take action to prevent transmission or delivery of the message.

Where a digital device analyzes the text of a digital, written, or verbal communication, resources on the digital device (e.g., a headset) may not have the computing power to perform the analysis with sufficient speed. In these cases, the device can monitor the text or message and transmit a digital copy of the text or message, or an extracted version thereof, to a remote device for processing. For instance, a headset may convert a verbal message to a digital signal that is then transmitted via Bluetooth or other wireless technology to a cellular phone, nearby server, or other nearby computer, where the nearby computer converts the digital signal to digital text, analyzes the text, and returns a signal to the headset indicating that the verbal message is flagged or not-flagged (i.e., indicating to the device whether or not to disable messaging functionality). In other words, processing of communications and flagging of non-compliant messages can be offloaded to nearby private computing devices that then indicate to the original messaging device whether or not to disable messaging functionality.

While the disclosure covers all manner of communications, including, but not limited to, digital, hardcopy, and verbal, particular examples of digital messages are now described in order to better illustrate the general functionality described above and applicable to all manner of communications.

FIG. 1 illustrates a method for disabling functionality of a digital messaging system before a compliance violation, due to content of a digital message, occurs. The method 100 includes monitoring an input of text (e.g., from a keyboard or voice dictation) in a monitor digital message input operation 102. The method 100 repeatedly analyzes the digital message to determine if a compliance violation has occurred via compliance violation decision 104. If no violation is found, then digital messaging functionality continues unimpeded until either a violation is identified or the digital message is sent via send operation 106. If the violation decision 104 identifies a violation, then digital messaging functionality is disabled in a disable operation 108. The disabling operation 108 takes effect until the violation is fixed as determined by the violation corrected decision 110. During the disabling of digital messaging functionality, the method 100 continues to monitor content of the digital message and via this monitoring the violation corrected decision 110 can be made. Once the violation corrected decision 110 determines that the violation has been corrected, an enable digital messaging functionality operation 112 enables the functionality that had been disabled. The method 100 then loops back to the monitor digital message input operation 102 until the message is ready to be sent or until another potential compliance violation is identified by decision 104. When the message is ready to be sent and no potential compliance violations exist, the user can indicate an intent to send the message (e.g., by pressing a "send" button or by pressing an "ENTER" key on a keyboard, for instance).

The method 100 can be applied to systems and platforms for monitoring of any type of digital messaging including email, instant messaging (e.g., YAHOO! INC.'s messenger service, AOL INSTANT MESSAGING (AIM), GOOGLE's GOOGLE+ HANGOUTS, and PIVOT, to name a few), digital messaging sent from mobile telephones, and digital messages exchanged in chat rooms. The method 100 can be embodied as an add-on to SMS text messaging services or to text messaging or instant messaging platforms that are proprietary to a cellular carrier or to a device manufacturer. In order to disable functionality before a compliance violation has occurred (e.g., before the message is sent and therefore logged), monitoring can be performed on the user device where the message is being drafted. For instance, the method 100 can be performed by a computing device being used to draft a digital message. In some embodiments, the method 100 can be carried out via components and modules stored on the computing device and running on a processor of the computing device, while in other embodiments, portions of the method 100 can be stored on remote computing devices and processors of those remote computing devices (e.g., a web-based application).

The monitor operation 102 can include extracting words, phrases, and/or sentences from a draft digital message before it is sent. This can include extracting words, phrases, and/or sentences as each is created (e.g., typed or dictated). For instance, keystrokes can be monitored or recorded, and then parsed into words. The monitor operation 102 can also include extracting words, phrases, and/or sentences only when a block of text has been completely created. For instance, words may not be extracted until a sentence has been completely drafted. In another instance, extraction occurs after completion of an idea, where the end of an idea can be identified via one or more symbols, including, but not limited to, a period, a semicolon. Some symbols that may be excluded from those indicating an end of a message are a space, a slash, a dash, a comma, and any symbol within a word used to replace a letter of that word. The end of an idea may also be indicated by a user selecting other than a current window of the user interface. In another instance, phrases may only be extracted when a paragraph has been completed. In other examples, words, phrases, and/or sentences may not be extracted until an entire draft digital message is completed. In another example, extracting may be triggered by a pause in the drafting (e.g., a pause in typing or dictation). Extracted words, phrases, and/or sentences can be stored in a buffer or other temporary memory.

In an alternative embodiment, the words, phrases, and/or sentences can be extracted only when a user provides an input to send the draft message (e.g., pressing a "send" button or pressing an "ENTER" key on a keyboard to name two non-limiting examples). For instance, the method 100 may operate to check draft messages for compliance at the moment just before they are sent. If a violation is found, then the message is not sent and correction is required. Otherwise, the message is sent without the user experiencing anything more than a slight delay in the sending of the message—the method 100 operating during the slight delay.

Given one or more words, phrases, and/or sentences from the monitor operation 102, the compliance violation decision 104 analyzes the extracted text to determine if a compliance violation is likely to occur if the draft digital message is sent. Analysis can include comparing the extracted text to a compliance database of text to identify matches or similarities to text identified as likely to cause a compliance violation. Other methods of determining if a violation has occurred will be discussed in subsequent portions of this disclosure. The decision 104 may also attempt to determine a meaning or thrust of a phrase, sentence, or other text structure in extracted text, and compare the meaning, thrust, or spirit of the text to concepts in the compliance database. If a match or similarity is found, then the decision 104 directs the method 100 to disabling digital messaging functionality.

The compliance database can include text, phrases, sentences, pairs of words, combinations of words, tables or arrays of words and/or phrases, and/or concepts that have been flagged or identified as violating, or potentially violating, compliance policy or law. In some instances, the compliance database may include various sub databases, each corresponding to different compliance laws and/or policies. In other instances, there may be a separate compliance database for each different set of compliance laws and/or policies.

In some embodiments, the decision 104 can analyze extracted text to determine if an intent of the extracted text violates a spirit of the compliance policy or law. For instance, words in digital messages can be assigned scores and greater scores or additional scores can be assigned where two or more words share a dependency or where one or more of the words fits a part of speech (e.g., nouns, verbs, present verbs, past verbs, adjectives, etc.). For instance, the word "fix", or derivatives thereof, as an adjective (e.g., "the electrician fixed the network") may be assigned a lower score than the word "fix", or derivatives thereof, as a verb (e.g., "yesterday we fixed the index").

Since matches to the database may not be exact, a sensitivity level can be set and modified by a user or company compliance officer. The sensitivity level can dictate a level of similarity between the intent of the extracted text and the spirit of the compliance policy or law at which the disable digital messaging functionality operation 108 is triggered as determined by the compliance violation decision 104. Where scores are assigned to the extracted text, the sensitivity may be used to control a threshold over which a total of scores for one or more words triggers the disable digital messaging functionality operation 108. The total can include a sum or product of scores.

If the compliance violation decision 104 determines that a violation will occur if the draft digital message is sent, then the method 100 disables digital messaging functionality in the disable operation 108. This can include disabling one or more functions of the digital messaging platform or even functions of the computing device or operating system upon which the digital messaging platform is running. For instance, a "send" button in the digital messaging platform may be disabled in one embodiment (e.g., see FIG. 11), while in another embodiment, the "send" button along with the ability to open, close, or access other applications or software on the computing device can be disabled (e.g., see FIGS. 12 and 13).

Functionality that can be disabled includes, but is not limited to, restrictions within the digital messaging platform. For instance, the following may be disabled: a transmission button (e.g., a "send" button); a transmission keystroke (e.g., pressing the "ENTER" key or return key on a keyboard); a transmission command (e.g., a "send" or "enter" voice command); further text entry in the message (e.g., see FIG. 15); editing of text in the message other than the text identified as triggering the disabling (e.g., see FIG. 15); and saving of the digital message (e.g., disabling of "save as a draft" functionality), to name a few.

Functionality that can be disabled includes, but is not limited to, functionality of applications, software, and background operations (e.g., daemons and services) other than the digital messaging platform. For instance, the following may be disabled: an ability to access software other than the digital messaging platform (see FIGS. 13 and 14); an ability to switch between software (see FIGS. 13 and 14); an ability to close or minimize a window of the messaging platform (e.g., see FIG. 14); an ability to view any windows other than that of the messaging platform (see FIGS. 13 and 14); an ability to turn off, restart, or put into standby the computing device that the digital messaging platform runs on; transmission or receipt of digital messages; Internet access; access to certain websites; access to web-based software; and an ability to upload or download data to the device on which the digital messaging platform is running, to name a few.

Functionality that can be disabled includes, but is not limited to, functionality of the computer device upon which the digital messaging platform is running. For instance, the following may be disabled: power controls; volume controls; screen brightness; screen orientation; the ability for the device's display to turn off; network interfaces; network interfaces used by the digital messaging platform; network interfaces used for incoming digital messaging; network interfaces used for incoming data traffic; network interfaces used for outgoing digital messaging; and network interfaces used for outgoing data traffic, to name a few non-limiting examples. In another embodiment, disabling digital messaging functionality includes precluding a digital message from reaching a network interface of a communication device. In another embodiment, disabling digital messaging functionality includes precluding a digital message from reaching a buffer of a network interface.

Various visualizations can be used to highlight the offending text. For instance, the offending text can be highlighted with a background color, or the text font can be changed (e.g., changed to bold and/or red color). Non-offending text can have its contrast or darkness decreased in another embodiment. In some cases, a message can be presented to the user notifying the user that the draft message has been flagged as having the potential to be a compliance violation and/or that correction is required. Such a message can merely notify the user of the problem or can further include language instructing the user to rectify the potential violation. In another instance, a message can suggest changes that the user can adapt in order to correct the potential violation.

Audible signals can also be used to notify to the user the threat of, or emphasize the threat of, the draft digital message. Such audible signals can be designed to have a volume, tone, and repetition that invoke tension or anxiety in a user and thereby act as a deterrent to future potential violations. The audible signal may also have characteristics that invoke tension or anxiety in a user such that the user is incentivized not to ignore the flagged text. The audible signal may have characteristics, such as high volume, designed to be heard by others so as to act as an incentive for the user to correct the potentially noncompliant text. Such audible signals may be combined with disabling of the volume function of a device. Such audible signals may carry on until the corrected violation decision 110 determines that the flagged text is corrected. In other embodiments, the audible signal may have different characteristics at different times, where a change to a second of the two characteristics is triggered by the computing device noting that a user has begun to correct the flagged text. For instance, the audible signal may be loud and obnoxious when flagged text is first detected, but may change to a calmer less noticeable sound once a user begins editing the text, and may go silent when the corrected violation decision 110 determines that the threat of a compliance violation has been removed.

Once functionality has been disabled in the disable operation 108, the method 100 waits until the potential violation is corrected. In an embodiment, this involves a loop of the corrected violation decision 110 and the disable digital messaging functionality operation 108 until the decision 110 determines that the potential violation has been corrected. The corrected violation decision 110 may use a similar mechanism to the compliance violation decision 104 to analyze extracted text and compare this to a database of text or use more sophisticated algorithms to compare the intent or spirit of extracted text to the spirit of compliance policy or law.

In other embodiments, the corrected violation decision 110 may involve a different mechanism than the compliance violation decision 104. For instance, the corrected violation decision 110 may look for deletion or modification of the text flagged as a potential violation.

Once the corrected violation decision 110 determines that digital messaging functionality can be reestablished, the enable digital messaging functionality operation 112 is carried out. The enable digital messaging functionality operation 112 can enable any functionality disabled by the disable digital messaging functionality operation 108.

With the digital messaging functionality enabled again, the user can indicate an intent to send the digital message (e.g., via pressing a "send" button) and this input can be converted to a send digital message instruction that the device uses to send the digital message in the send digital message operation 106. In an alternative embodiment (not illustrated), the user can initiate the method 100 by pressing a "send" button or giving some other indication of a desire to send a message. The message can then be analyzed and correction of text can be required as described above or the message can be sent, all after the user indicates a desire to send the message.

The method 100 can be implemented as a module or component added on to existing messaging platforms. For instance, the method 100 can be implemented with an instant messaging platforms such as AOL INSTANT MESSAGE (AIM), MSN MESSENGER, YAHOO MESSENGER, SKYPE, and GOOGLE TALK, to name a few non-limiting examples, and with e-mail clients such as MICROSOFT OUTLOOK, MAC MAIL, and GMAIL, to name a few non-limiting examples. The method 100 can also be implemented as a module or component added on to existing web browsers such as INTERNET EXPLORER, GOOGLE CHROME, FIREFOX, AND SAFARI, to name a few non-limiting examples. The method 100 can also be implemented in headsets, cellular phones, smartphones, mobile media devices, laptop computers, desktop computers, tablet computers, ultrabooks, server systems, smart clothing, smart watches and other 'smart' accessories, to name a few non-limiting examples.

There are a variety of ways to identify a compliance violation within a message. In some embodiments, the disclosure assigns scores to words and groups of words and determines whether a total of the scores exceeds a threshold. The total can be derived as a sum of scores or as a product of scores. In some instances, additional score can be added to or multiplied by the scores to account for more complex analysis of messages. The threshold can initially be set at a server side while the systems and methods operate on client devices. However, customers may suggest changes to the threshold based on experience with previous handlings of messages. For instance, a customer may request a higher threshold where too many compliant messages are being blocked. Alternatively, where a customer has experienced serious punishment for previous violations, the customer may request a lower threshold in order to exercise greater caution regarding transmission of messages from its employees.

Scores can be assigned to individual words, groups of words, or to ideas. Ideas are abstract representations of thought that the systems and methods herein disclosed identify in messages. Ideas can be identified via a variety of means, but one embodiment looks for certain symbols to indicate an end of an idea. For instance, periods and double spaces can indicate an end of an idea. Ideas can also be identified via a message creator selecting a different user interface window than the current user interface window, selecting "ENTER", "SEND", or carriage return. These are just a few of the many symbols and actions that can be used to identify an end of an idea.

Ideas are often used to separate groups of words such that logical combinations of words are assigned scores rather than assigning scores to combinations of words that an author did not intend to be lumped together. For instance, where "set" and "index" appear in the same idea (e.g., in the same sentence) a potential violation may be likely. However, where those two words are seen in different sentences, a violation is far less likely. Thus, by analyzing combinations of terms in a given idea the systems and methods can avoid false positives.

Scores can be assigned during creation of an idea or after one or more ideas have been created. For instance, a score can be assigned to the word "set" at the start of an idea, or can be assigned to the word "set" only after an idea has been generated by a message creator.

Where scores are assigned to individual words, a database of words can be compared to words in a message, where each word in the database is associated with a score that reflects the likelihood that such a word will be seen in a non-compliant message. For instance, the word "set" may be assigned a score of half a threshold while the word, "index" may be assigned a score greater than the threshold. Thus, if "set" is found in a message, the message may not be blocked. However, if "index" is found in a message, regardless of the other words in the message, the message will be blocked. "Set" may be a "risky" word while "index" may be a "prohibited" word. In other words, risky words are those associated with scores less than the threshold, such that two or more are required to surpass the threshold. Prohibited words are those associated with scores greater than the threshold, such that these words alone can trigger blocking of a message.

In some cases a message can be blocked immediately after a total score for a message exceeds the threshold. However, since such instances may include portions of messages that appear to create violations, but will not be if the rest of the message is generated, the systems and methods herein, in some embodiments, may continue to analyze a message as it is created even if messaging functionality has been temporarily suspended. So, while messaging functionality may be disabled at one point during creation of a message, functionality may be enabled at a later point if the message or idea turns out to be compliant.

Identifying potential compliance violations in messages may account for various spellings of prohibited and risky words. For instance, the following non-exhaustive examples may all be assigned a score associated with the word "damn": damn, d.a.m.n, da [line break] mn, d a m n. Along these same lines, various spell checking modules can be used to ascertain whether text in a message represents the word that has actually been entered or recorded, or whether a typo has occurred and the intended word is other than that actually entered or recorded. In other words, the systems and methods herein disclosed can use a spell checking library (e.g., Hunspell) to identify matches in a phrase table when the recorded keystrokes are misspelled.

Figure 2:
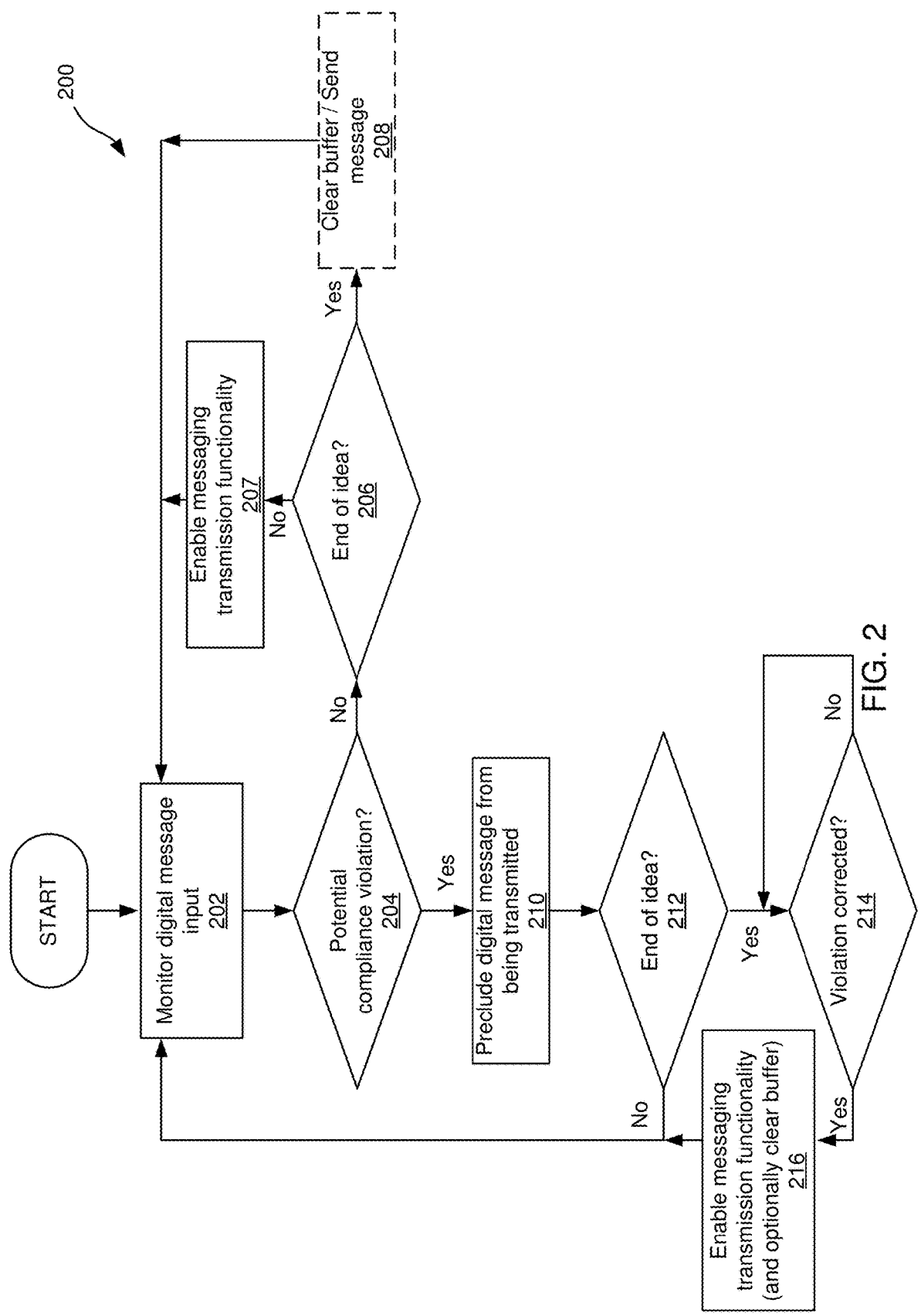
FIG. 2 illustrates a method of precluding a non-compliant digital message from being transmitted from a communication device.

FIG. 2 illustrates a method of precluding a non-compliant digital message from being transmitted from a communication device. While FIG. 2 is described in terms of a digital message, the method 200 is equally applicable to written and verbal messages as well.

In some cases, potential compliance violations can be identified as a digital message is created and before a complete idea has been formed. FIG. 2 illustrates a method of precluding a non-compliant digital message from being transmitted from a communication device. The method 200 can include monitoring an input of a digital message (Block 202). The method 200 can then determine if the digital message comprises a potential compliance violation (Decision 204). If so, then the method 200 can preclude the digital message from being transmitted from the communication device (Block 210). The method 200 can then monitor the input of the digital message to determine if the compliance violation is remedied and enable digital messaging transmission functionality of the communication device once the compliance violation is remedied. This monitoring and determination as to whether the violation has been corrected can be real-time (e.g., repeatedly assessed as further text is inputted) or can be analyzed at the end of an idea. For instance, FIG. 2 shows the variation where such determination occurs after an end of an idea is identified. In particular, after preclusion of the digital message from being transmitted (Block 210), the method determines if an end of an idea has occurred (Decision 212). If so, then the method 200 determines if the violation has been corrected (Decision 214). This determination continues until the violation has been corrected (and hence preclusion of digital messaging continues). Once corrected, the method 200 re-enables messaging transmission functionality and optionally clears the buffer of the record of keystrokes for the idea (Block 216). The method 200 then loops back to monitor the digital message input (Block 202) for a new idea.

If preclusion of the digital message from begin transmitted (Block 210) has occurred, and an end of an idea is not identified (Decision 212), then the method 200 loops back to continue monitoring the digital message input (Block 202) for the current idea.

If a potential compliance violation is found (Decision 204), the method 200 then looks to see if an end of an idea exists (Decision 206). If so, then the method 200 can loop back to continue monitoring the digital message input (Block 202) and optionally clear the buffer of data related to the idea and/or send the digital message (Block 208).

Figure 3:
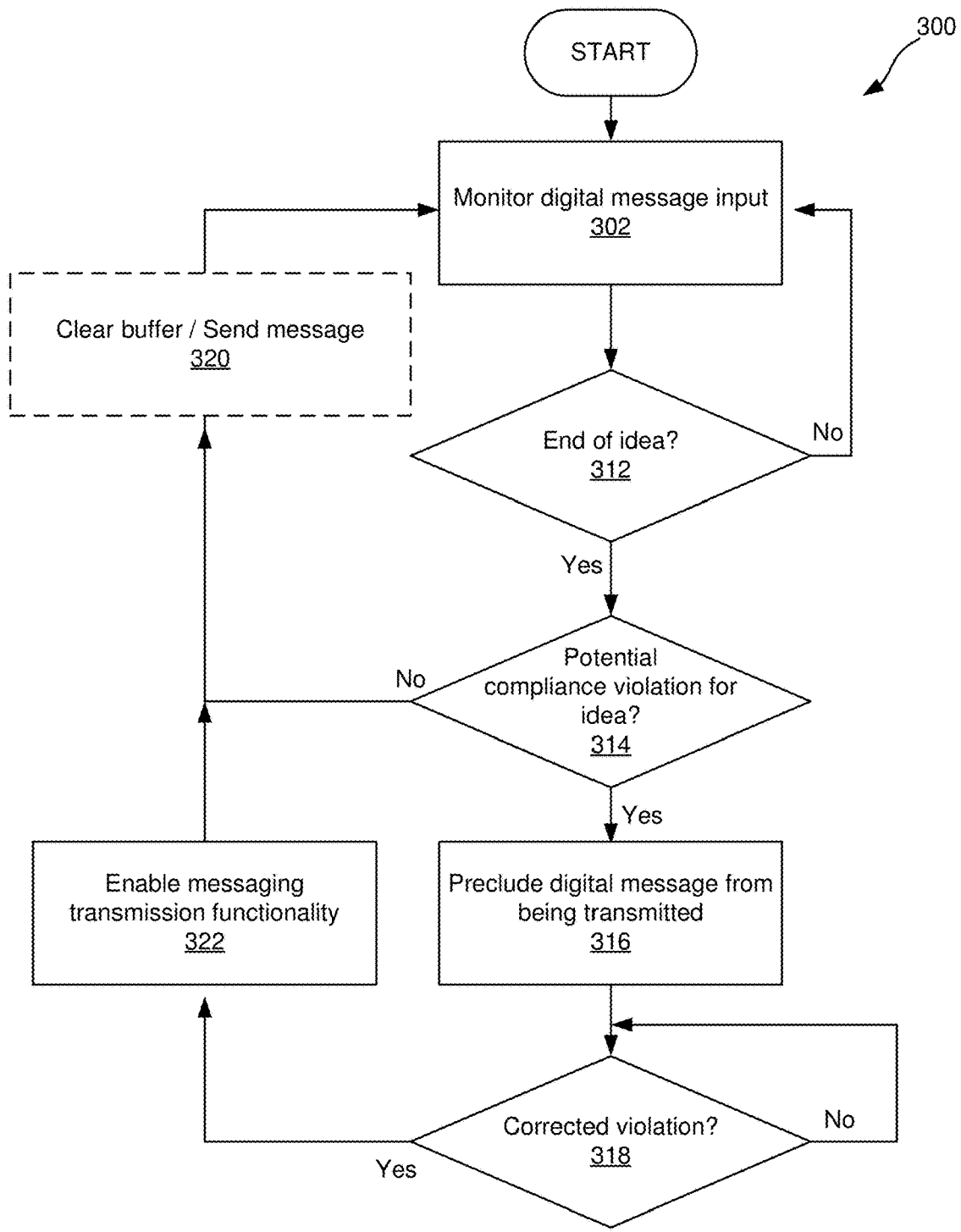
FIG. 3 illustrates another method of precluding a non-compliant digital message from being transmitted from a communication device.

In some instances, potential compliance violations can be identified during message creation but only after sufficient words have been inputted to form a complete idea. FIG. 3 illustrates another method of precluding a non-compliant digital message from being transmitted from a communication device. The method 300 includes monitoring a digital message input (Block 302) and identifying an end of an idea (Decision 312). Once an idea has been identified (Decision 312), the method 300 determines if the content of the idea contains a potential compliance violation (Decision 314). If not, then the method 300 can loop back to continue monitoring the digital message input (Block 302) and optionally clear the buffer of data related the current idea and/or send the message (Block 320).

If a potential compliance violation is found in the idea (Decision 314), then the method 300 precludes digital messages from being transmitted (Block 316). The method 300 then monitors the digital message input until the violation is corrected (Decision 318) and then enables messaging transmission functionality (Block 322). The method 300 then loops back to continue monitoring the digital message input and optionally clears the buffer of any data related to the idea and/or sends the message (Block 320).

Precluding digital messages from being transmitted (Block 316) may include disabling a messaging functionality of the communication device.

Figure 4:
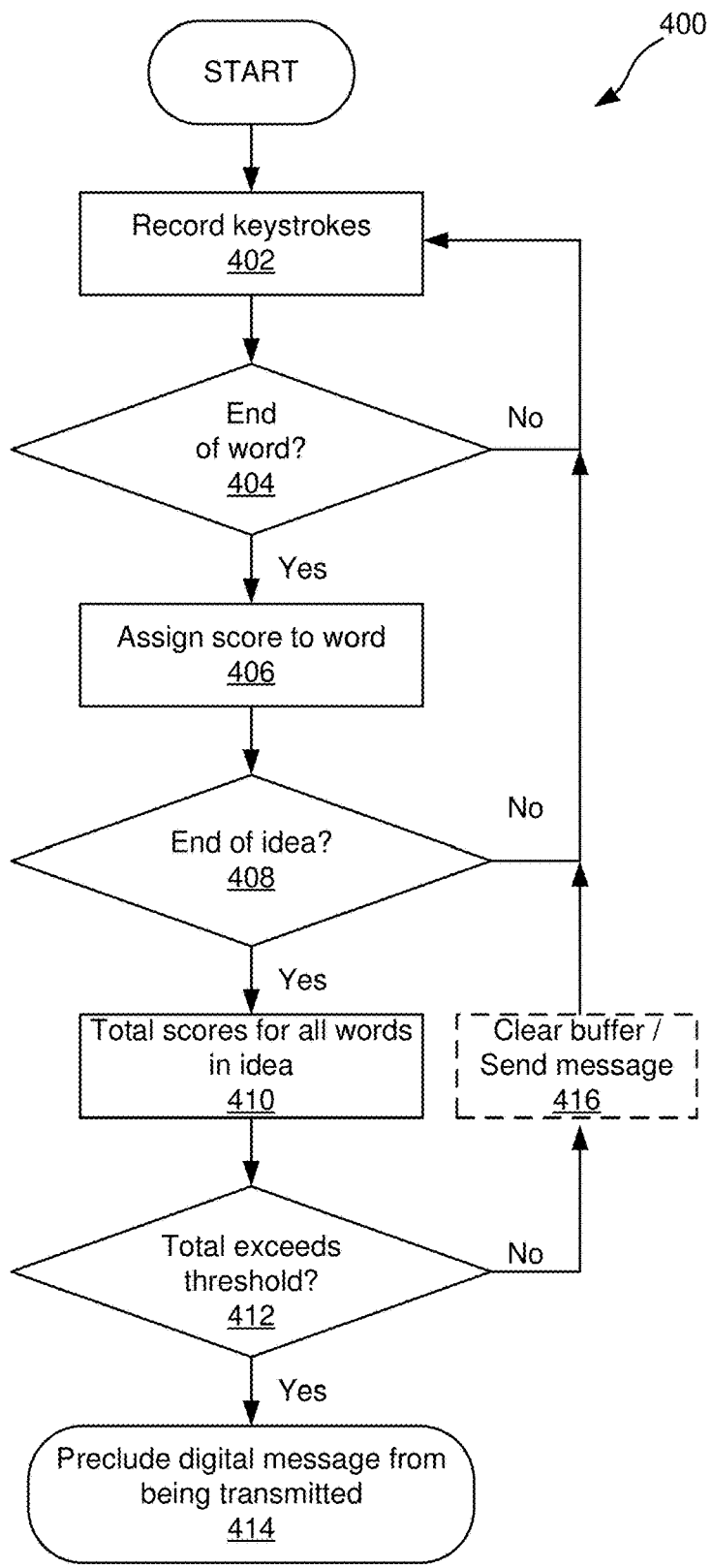
FIG. 4 illustrates a method of precluding a non-compliant digital message from being transmitted from a communication device.

In other embodiments, potential compliance violations can be identified by assigning scores to words and sets of words in complete ideas and totals of the scores can be compared to a threshold. FIG. 4 illustrates a method of precluding a non-compliant digital message from being transmitted from a communication device. The method 400 can include recording keystrokes on a first computing device (Block 402). The keystrokes can be part of a digital message. However, the method 400 is also applicable to written and verbal messages. The method 400 can further include identifying an end of a word (Decision 404). For each word, a score is assigned (Block 406). As words are assigned scores, the method 400 also looks for ideas (Decision 408) and when one is found, the method 400 totals the scores for all words in the idea (Block 410). The total is then compared to a threshold (Decision 412) and if the total exceeds the threshold, then the method 400 precludes the digital message from being transmitted (Block 414). If the total does not exceed the threshold, then the method 400 can optionally clear the buffer of data related to the idea and/or sends the message (Block 416). However, in some cases, the method 400 can go on recording keystrokes (Block 402) and continue identifying potential violations without clearing the buffer or sending the message. For instance, an idea may be identified via recording the entry of a period (an end of a sentence). But rather than treat the next sentence as a standalone idea, the method 400 can analyze multiple sentences to determine potential compliance violations. Hence, clearing of the buffer (Block 416) is optional.

When assigning scores, words, combinations of words, or phrases that are deemed "prohibited" can be assigned scores equal to or greater than the threshold. In this way, the existence of a single prohibited word, group of words, or phrase, will trigger the preclusion of the digital message from being transmitted (Block 414). Words, groups of words, or phrases deemed "risky" are those in which at least two or more such words or groups of words are needed in a given idea in order for the idea to form a potentially non-compliant message. These risky words, groups of words, or phrases can be assigned scores less than the threshold. Thus, two or more risky words, groups of words, or phrases are needed in a single idea in order for the total to exceed the threshold. While the method 400 looks at total scores for a given idea, in other embodiments, totals can be compared to a threshold across multiple ideas (e.g., two or more sentences).

Identifying an end of a word (Decision 404) may involve parsing the keystrokes into words and symbols.

Figure 5:
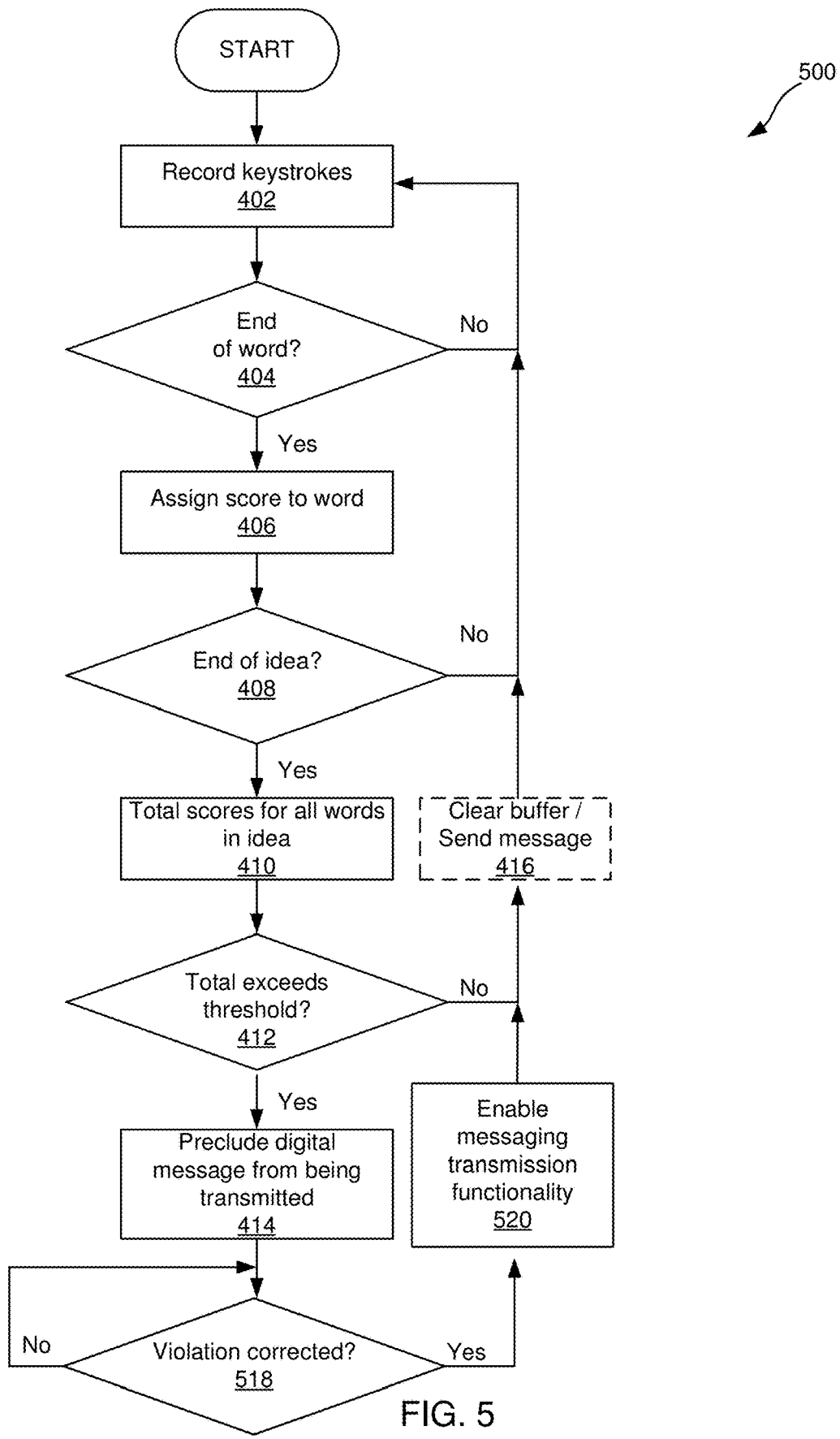
FIG. 5 illustrates another method of precluding a non-compliant digital message from being transmitted from a communication device.

FIG. 5 shows a method similar to that of FIG. 4, but further including the ability to enable messaging functionality if a potential compliance violation is corrected. The method 500 is identical to the method 400 until the preclusion of the digital message from being transmitted. The method 500 then monitors the digital message to see if the violation is corrected (Decision 518). If the violation is corrected, then the method enables the messaging transmission functionality (Block 520). The method 500 then loops back to recording keystrokes (Block 402) and can optionally clear the buffer of data related to the idea and/or send the message (Block 416).

Figure 6:
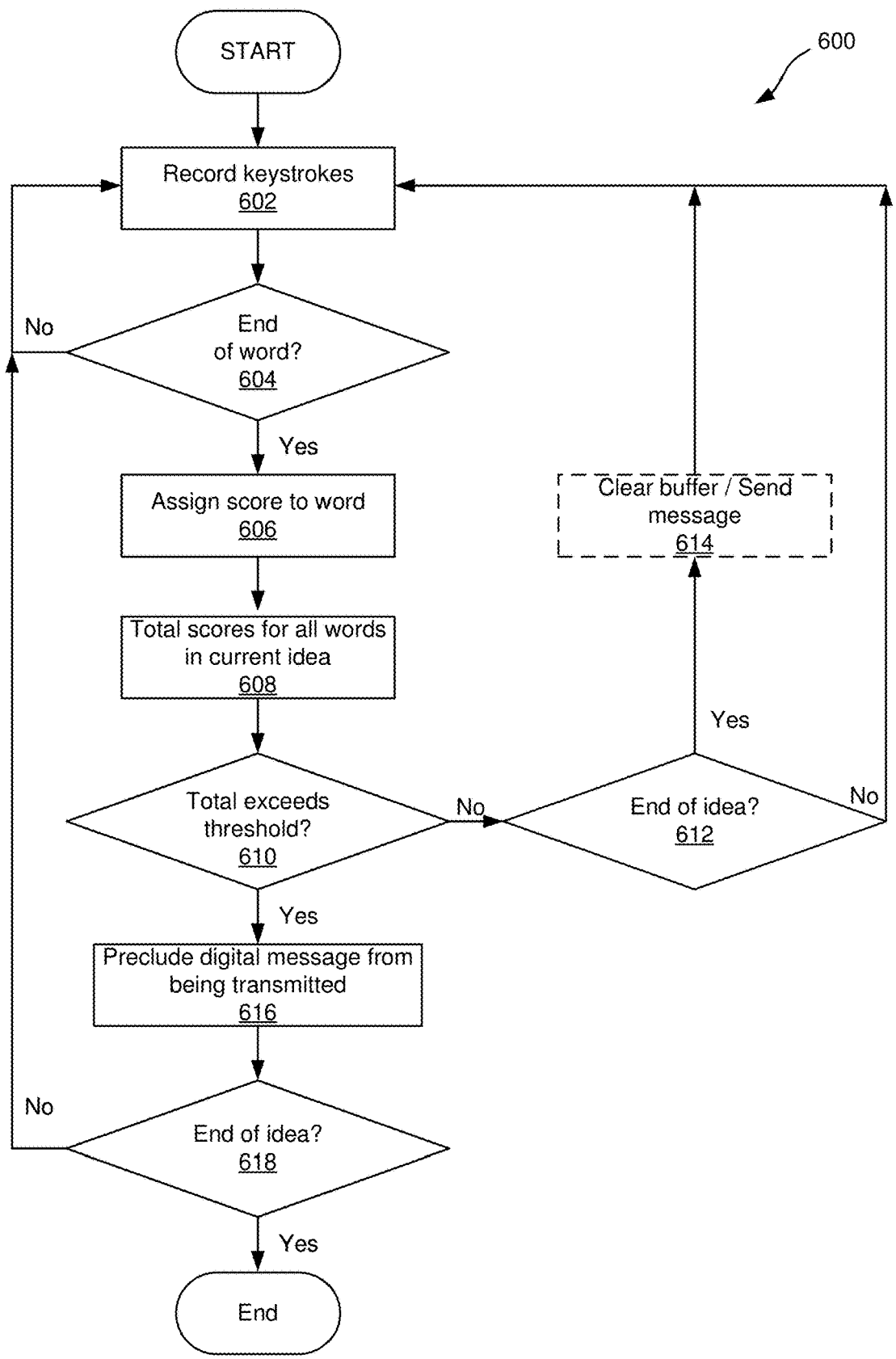
FIG. 6 illustrates yet another method of precluding a non-compliant digital message from being transmitted from a communication device.

In other embodiments, potential compliance violations can be identified by assigning scores to words and sets of words as messages are generated and comparing these totals to thresholds even before completion of an idea. FIG. 6 illustrates yet a further embodiment of a method of precluding a non-compliant digital message from being transmitted from a communication device. The method 600 can include recording keystrokes on a first computing device (Block 602). The keystrokes can be part of a digital message. However, the method 600 is also applicable to written and verbal messages, the former by applying the method to all text in a written message, and the latter by applying the method in combination with an interpreter for converting spoken words to text. The method 600 can further include identifying an end of a word (Decision 604). For each word, a score is assigned (Block 606). The method 600 totals the scores for all words in the current idea (Block 608). The total is then compared to a threshold (Decision 610) and if the total exceeds the threshold, then the method 600 precludes the digital message from being transmitted (Block 616). The method 600 then determines if an end to the current idea has been identified (Decision 618). If so, then the method 600 ends, with digital messaging functionality disabled. However, if the idea is not at an end (Decision 618), then the method 600 continues recording keystrokes (Block 602) and looking for potential compliance violations.

Returning to the threshold comparison, if the total does not exceed the threshold (Decision 610), then the method 600 looks for an end of the current idea (Decision 612). If no end has been found, then the method 600 continues recording keystrokes (Block 602). If the method 600 has reached an end of the current idea (Decision 612), then the method 600 can optionally clear the buffer of data related to the idea and/or sends the message (Block 614). However, in some cases, the method 600 can go on recording keystrokes (Block 602) and continue identifying potential violations without clearing the buffer or sending the message. For instance, an idea may be identified via recording the entry of a period (an end of a sentence). But rather than treat the next sentence as a standalone idea, the method 600 can analyze multiple sentences to determine potential compliance violations. Hence, clearing of the buffer (Block 614) is optional.

Figure 7:
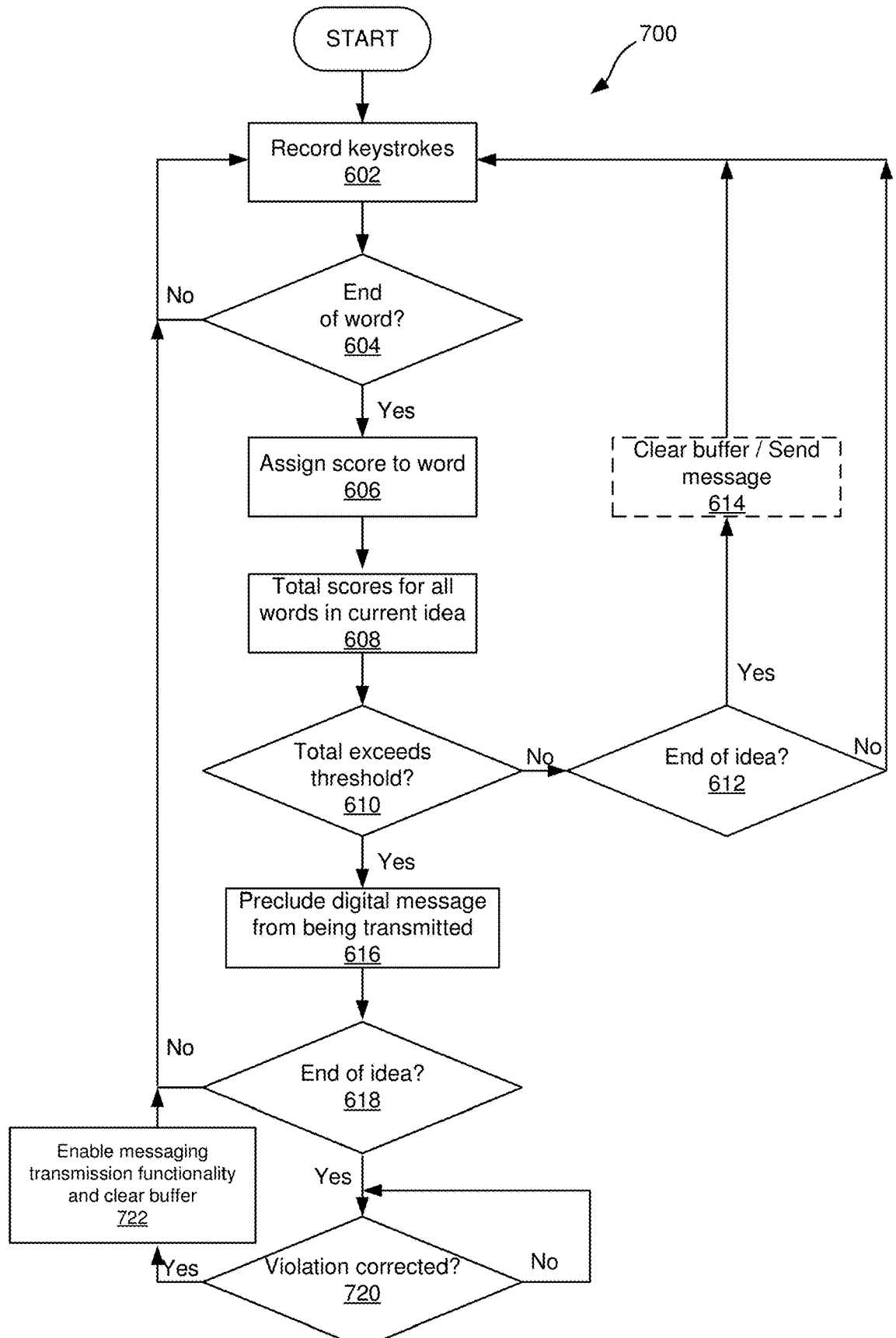
FIG. 7 illustrates yet another method of precluding a non-compliant digital message from being transmitted from a communication device.

FIG. 7 shows a method similar to that of FIG. 6, but further including the ability to enable messaging functionality if a potential compliance violation is corrected. The method 700 is identical to the method 700 until the end of an idea is identified (Decision 618) and the total exceeds the threshold (Decision 610). At this point, the method 700 looks for correction of the violation (Decision 720) rather than coming to an end. If the violation is corrected, then the method 700 enables messaging transmission functionality (Block 722) and optionally clears the buffer and/or sends the message.

Figure 10:
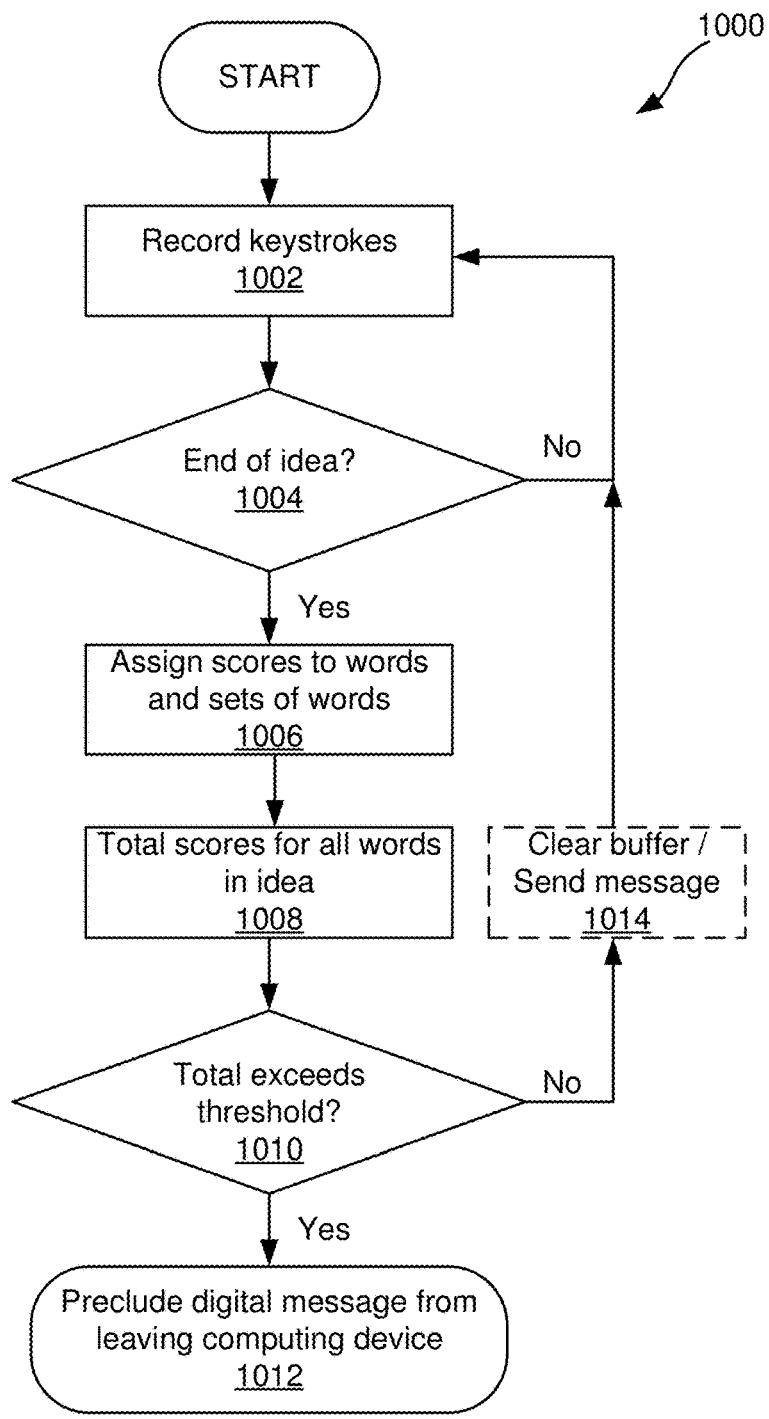
FIG. 10 illustrates yet another method of precluding a non-compliant digital message from being transmitted from a communication device.

In some embodiments, an idea can be identified before scores are assigned to words and sets of words within the idea. FIG. 10 illustrates a method of precluding a non-compliant digital message from being transmitted from a communication device The method 1000 can include recording keystrokes on a first computing device (Block 1002). The keystrokes can be part of a digital message. The method 1000 can further include identifying an end of a block of keystrokes representing an idea (Block 1004). The method 1000 can also include assigning a score to each of the words (Block 1006). The method 1000 can further include calculating a total of the scores assigned to each of the words and or groups of words in the idea (Block 1008). The method 1000 can yet further include determining that the total exceeds a threshold (Block 1010). If the total exceeds the threshold, then the method 1000 precludes the message from leaving the computer device (Block 1012). If the total does not exceed the threshold then the buffer can be optionally cleared of data related to the idea and/or the message can be sent (Block 1014). However, in some cases, the method can go on recording keystrokes (Block 1002) and continuing identifying potential violations without clearing the buffer or sending the message. For instance, an idea may be identified via recording the entry of a period (an end of a sentence). But rather than treat the next sentence as a standalone idea, the method 1000 can analyze multiple sentences to determine potential compliance violations. Hence, clearing of the buffer (Block 1014) is optional.

Some aspects of the disclosure describe ways to optimize a model for identifying potential compliance violations. In particular, feedback from compliance experts can be crowd-sourced through the application of the systems and methods herein disclosed. Previous attempts to automatically preclude dissemination of potentially non-compliant messages suffer from an inability to create accurate models for identifying potentially non-compliant messages. One way to accomplish this is to manually flag hundreds of thousands of messages and then allow a model to optimize its parameters based on these manually-flagged messages. However, the resources to perform such manual flagging are not available in the art. The inventors in contrast recognized that customers for such a non-compliant message preclusion system could perform the manual flagging.

Thus, one aspect of the disclosure is a method that includes assigning scores to words and combinations of words in a message, before the message is sent, in order to determine if the message is potentially in violation of compliance. The method can further include running one or more messages through an algorithm that determines which of the messages are potential violations of compliance policies. The results can be provided to compliance experts within customer entities. The system can then receive feedback from the compliance experts indicating an accuracy of the results. Using this feedback, the model can adjust the scores that are assigned to words and groups of words. This process can be repeated for a plurality of customers (and the tens of thousands of messages that each customer sends through the model), thereby obtaining a set of scores for words and combinations of words that have been trained by a large number of compliance experts.

Figure 8:
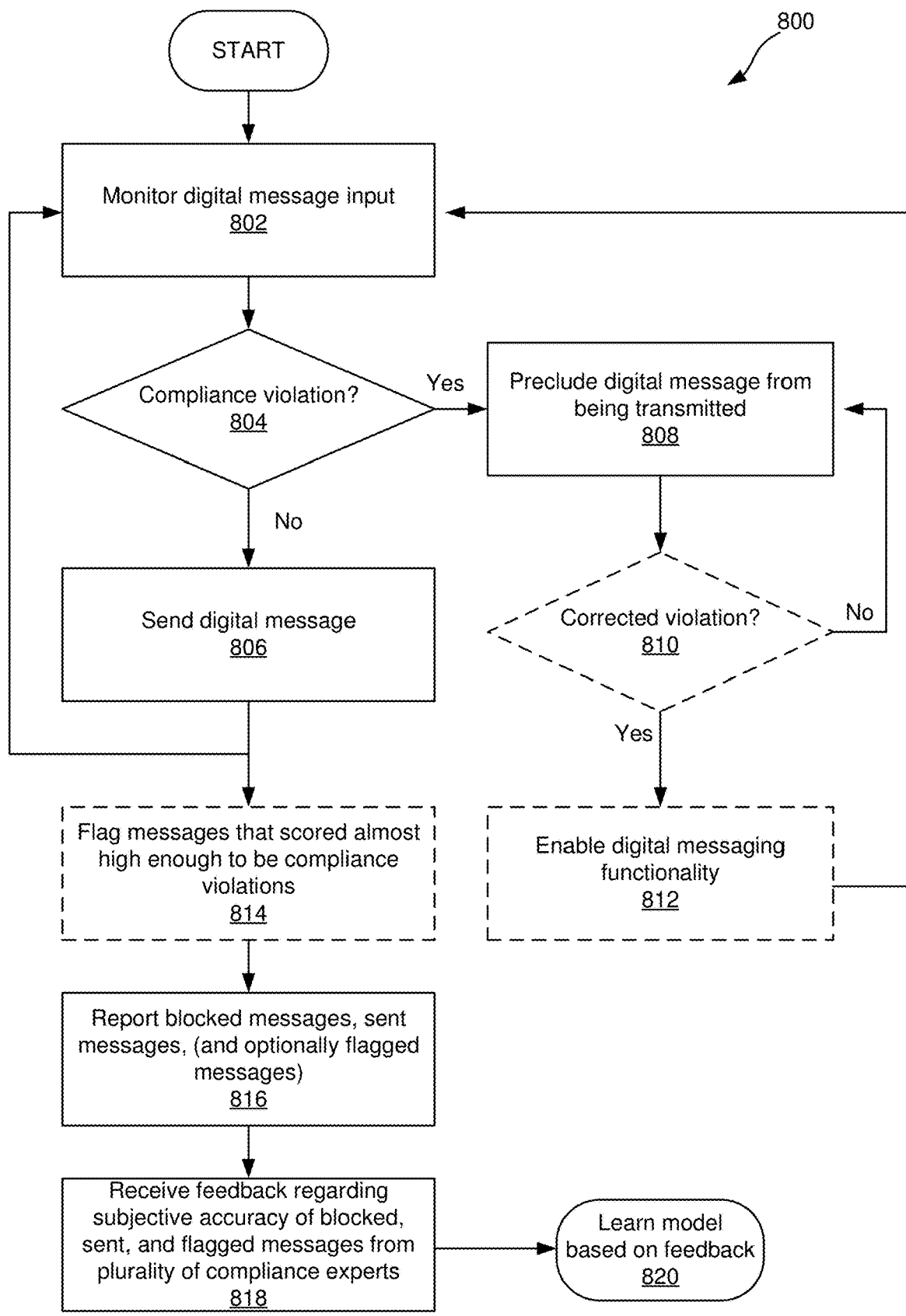
FIG. 8 illustrates yet another method of precluding a non-compliant digital message from being transmitted from a communication device.

FIG. 8 illustrates a method for optimizing a model that is used to identify potential compliance violations. The method 800 includes monitoring a digital message input (Block 802) and identifying a compliance violation (Block 804). Given a violation, the method 800 precludes a current digital message from being transmitted (Block 808). The method 800 then optionally waits for the violation to be corrected (Decision 810), and optionally enables digital messaging functionality (Block 812) once the violation is corrected. Whether the optional aspects of the method 800 occur or not, the method 800 then continues to monitor the digital message input (Block 802). When a compliance violation is not observed for a given message (Decision 804), the method 800 allows the digital message to be sent (Block 806) and continues to monitor subsequent messages (Block 802). After each instance of a message being sent (or optionally after a message being blocked or flagged or after a period of time or number of messages have been passed through the method 800) the method 800 optionally flags messages that were assigned scores that almost exceeded a threshold (e.g., within 5%, within 10%, within 15%, or within 20% of the threshold) (Block 814). The method 800 then reports blocked messages, sent messages, and optionally flagged messages (Block 816). The reporting can be made to customers and in particular to one or more compliance experts of a customer. The compliance expert(s) can then review the report and provide feedback (Block 818). Such feedback can include indications of words or combinations of words that should be considered prohibited or risky, to name one example. The method 800 can then receive the feedback, which indicates a subjective accuracy of blocked, sent, and optionally flagged messages from a plurality of compliance experts. The method 800 then learns the model based on this feedback (Block 820).

In the various methods of FIGS. 1-8 and 10, once a potentially non-compliant message is identified, further message input can be disabled as well as message transmission functionality. For instance, further text input may be prevented or the offending text may be automatically deleted. Where offending text is deleted, this text may also be removed from a buffer of the computing device, or removed from a messaging buffer but added to a reporting buffer that is later used to generate reports for the customer. In some cases, all additional inputs to a computing device, including all mouse and touch-based inputs may be disabled. In some cases, all message transmission inputs (e.g., a "SEND" button) can be disabled.

Figure 9:
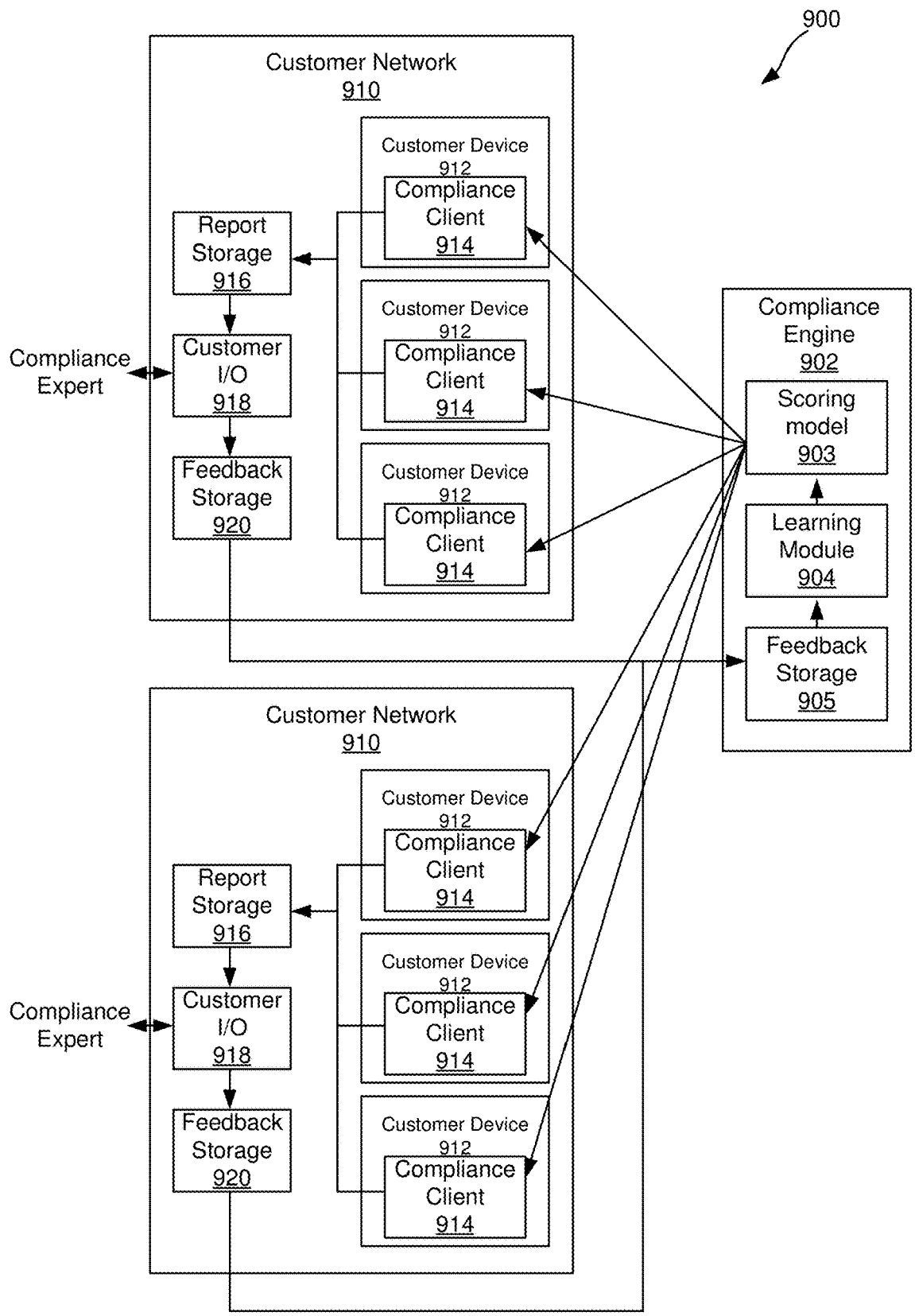
FIG. 9 illustrates a system for identifying potential compliance violations in digital messages and precluding transmission of such messages while the potential violation exists.

FIG. 9 illustrates a system for identifying potential compliance violations in digital messages and precluding transmission of such messages while the potential violation exists. The system 900 can include a compliance engine 902 configured as a server in a client-server relationship with a plurality of customer networks 910 (only two of which are shown). The compliance engine can be configured to maintain a model that is used by compliance clients 914 to identify potentially non-compliant messages being created on the customer networks 910. The compliance clients 914 can then block messages that are identified as non-compliant or identified has having non-compliant messages in them. Blocking a message means that the message is unable to leave the customer network 910 and in many embodiments means that a message is unable to leave a customer device 912 on which the message is created. Prior art filtering systems tend to analyze messages, such as e-mail, once the message has reached an intermediary server (e.g., before the message reaches a recipient, but after it leaves the device on which the message was created) or location (e.g., for preventing phone calls from reaching a location that would lead to a compliance violation). For many compliance situations, these filters are inadequate since a message that is stored on an intermediary server, even if it never reaches its recipient, still constitutes a compliance violation. For instance, in financial services, an instant message that is filtered at an intermediary server, but before reaching a recipient, is still a compliance violation since it has been stored on a device that is visible to compliance officials. Similarly, even if a message reaches a company's internal server and is then blocked, that company may still be required to report non-compliant messages to federal agencies, even though the message never left the company's control. Therefore, the herein disclosed systems and methods build upon the prior art by preventing potentially non-compliant messages from ever leaving a device on which they are created.

The compliance engine 902 can include a scoring model 903, a learning module 904, and a feedback storage 905. The scoring model 903 can be replicated on the compliance clients 914, which each reside on a customer devices 912, where there can be one or more customer devices 912 on each customer network 910. Three customer devices 912 are shown on each customer network 910, but fewer or more customer devices 912 can also be implanted.

As a user creates a message on a customer device 912 (e.g., a mobile phone or a desktop computer with an instant messaging platform, to name two non-limiting examples), the compliance client 914 can monitor the message and preclude message transmission or messaging functionality if a potential compliance violation is identified in the message (e.g., preclude the message from reaching a network interface of the customer device 912 or a messaging buffer of the customer device 912). Such analysis can occur in real time or after a certain trigger. For real time analysis, each word or groups of words can be analyzed as they are created without waiting for a trigger. Where a trigger is used, the trigger can be the completion of an idea, an attempt to send the message, or an attempt to navigate away from a user interface window in which the message was being created.

In some cases the compliance client 914 can disable messaging functionality, but remain open to the possibility that the message may turn out to be compliant, and thus later enable messaging as message creation continues. Alternatively, the compliance client 914 can disable both messaging and further text input (and/or the ability to change user interface windows) whenever a potential compliance violation is identified. In these cases, the compliance client 914 may monitor for corrections of the violation (e.g., a user deleting non-compliant text) and then enable messaging once the potential violation has been removed. In other instances, the compliance client 914 may remove the portion of a message that creates the potential violation. In this variation, messaging functionality may be re-enabled once the compliance client 914 has automatically removed the potentially offending portion of the message.

The scoring model 903 can be updated by the learning module 904, for instance by increasing or decreasing scores that are assigned to words or groups of words. Updates might also include changes to the groups of words that are assigned scores or to the relationships between words that are associated with certain scores. Other updates to scoring in the scoring model 903 can also be made. The learning module 904 can base its actions on the feedback storage 905, where feedback is provided by the customer networks 910. The feedback can include subjective feedback regarding an accuracy of the compliance clients' 914 actions. For instance, feedback may include indications that certain words or combinations of words are being given too much weight. In another example, feedback may include a request that certain words be deemed prohibited words, and thus that such words be assigned scores that are above the threshold. Feedback may also include requests or suggestions that the threshold be raised or lowered.

The feedback can be used to update the scoring model 903 for all compliance clients 914 across all customer networks 910, updates can be unique to each customer network 910, or both. For instance, one customer may provide feedback including a request to change the threshold or to change the scoring associated with a particular term, and the scoring model 903 can be updated for the customer network 910 associated with the request, but remain unchanged for all other customer networks 910. Updates to the scoring model 903 can be pushed to the compliance clients 914 on each customer network 910. Updates that are pushed to the compliance clients 914 can include updated phrase templates.

So that customers can review the effectiveness of the compliance clients 914, reports can be provided to each customer and the customer can provide feedback that can be used to influence and train the scoring model 903. Each customer network 910 can include a report storage 916, a customer input-output 918 (I/O), and a feedback storage 920. The compliance clients 914 can provide data regarding those messages that were blocked, transmitted, and optionally flagged to the report storage 916 for each customer network 910. Reported data can also include parameters of the model such as the threshold and scores that are being used. This data can be provided to the customer I/O 918 as a report and thereby presented to the customer (e.g., to one or more compliance experts of the customer). The customer can provide subjective feedback regarding the report via the customer I/O 918 and this feedback can be stored in a feedback storage 920 of the customer network 910. The feedback is then passed to the compliance engine 902 and stored in a feedback storage 905 of the compliance engine 902. Feedback from the plurality of customer networks 910 can be provided such that the learning module 904 is able to optimize the scoring model 903 based on feedback from a large number of customer networks 910 and potentially a large number of compliance experts. In other words, the job of providing subjective manual feedback can be crowd-sourced using the customers as the crowd. This saves time and money as compared to previous attempts to automatically filter non-compliant messages, and in fact makes this automated process possible where the resources simply did not exist to perform this message blocking via prior art methods.

In some embodiments, the scoring model 903 can be trained even before a first use of the compliance clients 914 with real-time messages occurs. For instance, the customer can run one or more compliance clients 914 on previously-transmitted messages and then provide feedback based on reports for these previously-transmitted messages. In this way, the scoring model 903 can be trained for different customers before compliance clients 914 are activated for real-time message blocking.

In some embodiments, the compliance clients 914 can flag ideas, messages, or words that are close to surpassing the threshold, but do not actually surpass the threshold. When these flagged ideas, messages, or words are provided in a report to the customer and a compliance expert, the customer can provide feedback relative to these flagged ideas, messages, or words (e.g., a flagged word should have been scored as a prohibited word) and thus an added level of feedback can be provided for training the scoring model 903.

The customer devices 912 can include various computing devices such as communication devices. A few non-limiting examples include cellular phones or smartphones, tablet computers, and desktop computers. Other examples include fax machines and voice recorders.

The customer networks 910 can be private or local area networks and optionally are firewalled or otherwise isolated from each other. In some embodiments, a customer network 910 can include public network connections between internal components, for instance, where one or more customer devices 912 are connected to the report storage 916 via the Internet.

Figure 11:
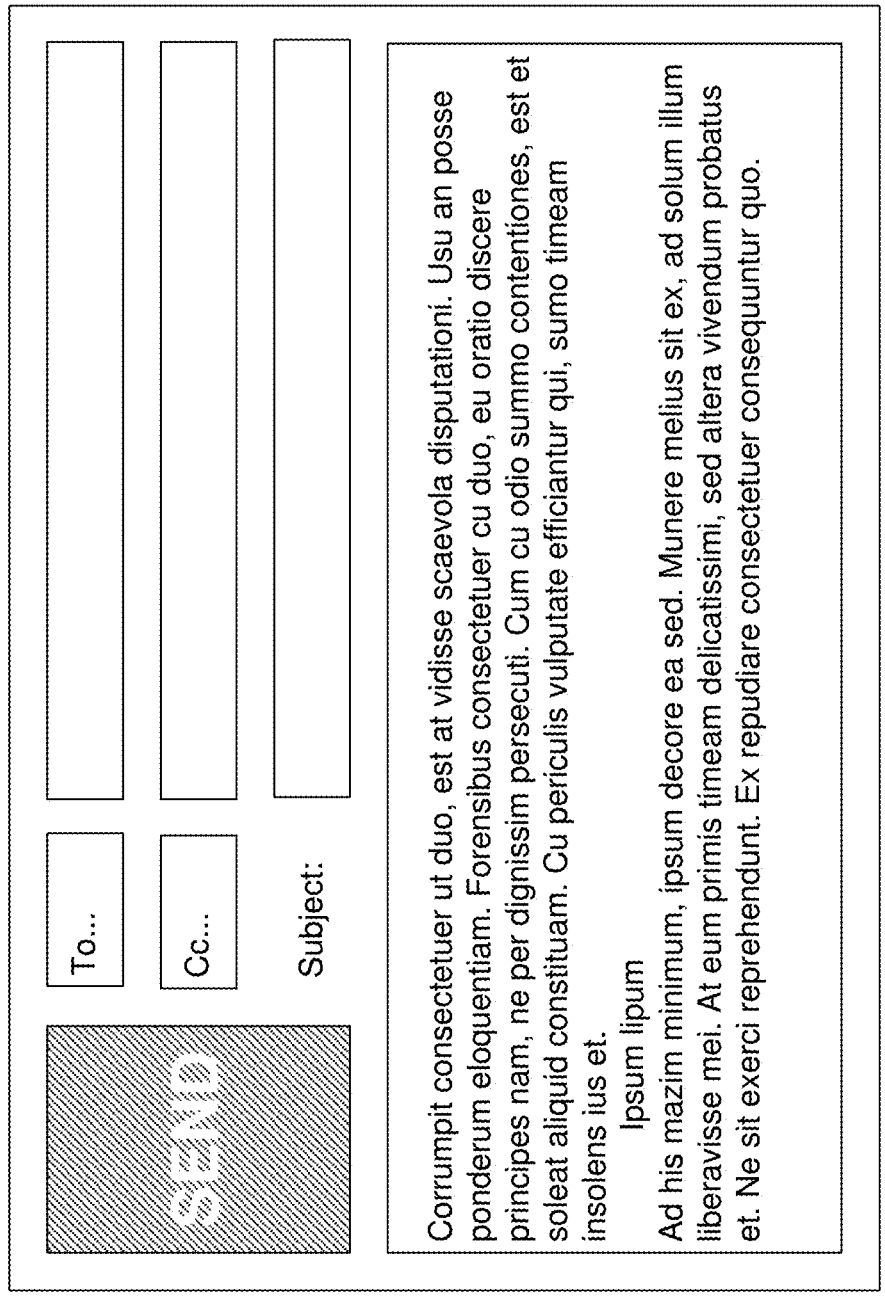
FIG. 11 illustrates an embodiment of a digital message with at least one digital messaging function disabled.

FIG. 11 illustrates an embodiment of a digital message with at least one digital messaging function disabled. In particular, an ability to send the digital message has been disabled. In the illustrated embodiment, this includes a visual indicator that the send functionality has been disabled, although in other instances the functionality can be disabled without an accompanying visual indicator.

Figure 12:
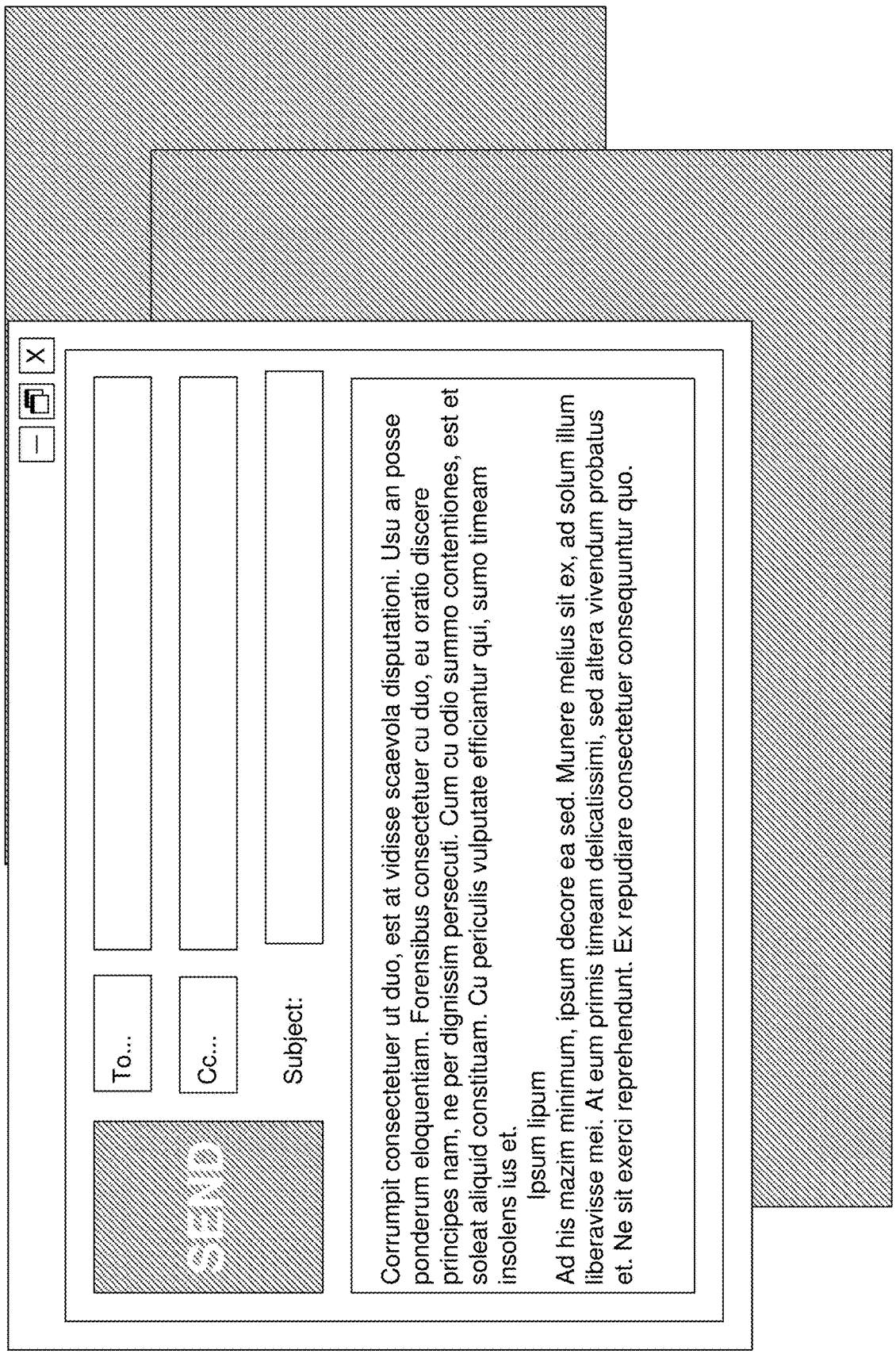
FIG. 12 illustrates another embodiment of a digital message with at least one digital messaging function disabled.

FIG. 12 illustrates another embodiment of a digital message with at least one digital messaging function disabled. In particular, an ability to send the digital message has been disabled along with an ability to access other windows or other open programs on a computing device. The illustrated embodiment also includes a visual indicator indicating that the other windows and/or other applications are not accessible, although such visual indicator is not required. In some cases, the visual indicator may be a mere change in color or contrast of the other windows or applications. As illustrated, the visual indicator covers or blocks viewing of the contents of the other windows or applications, although this is not required.

Figure 13:
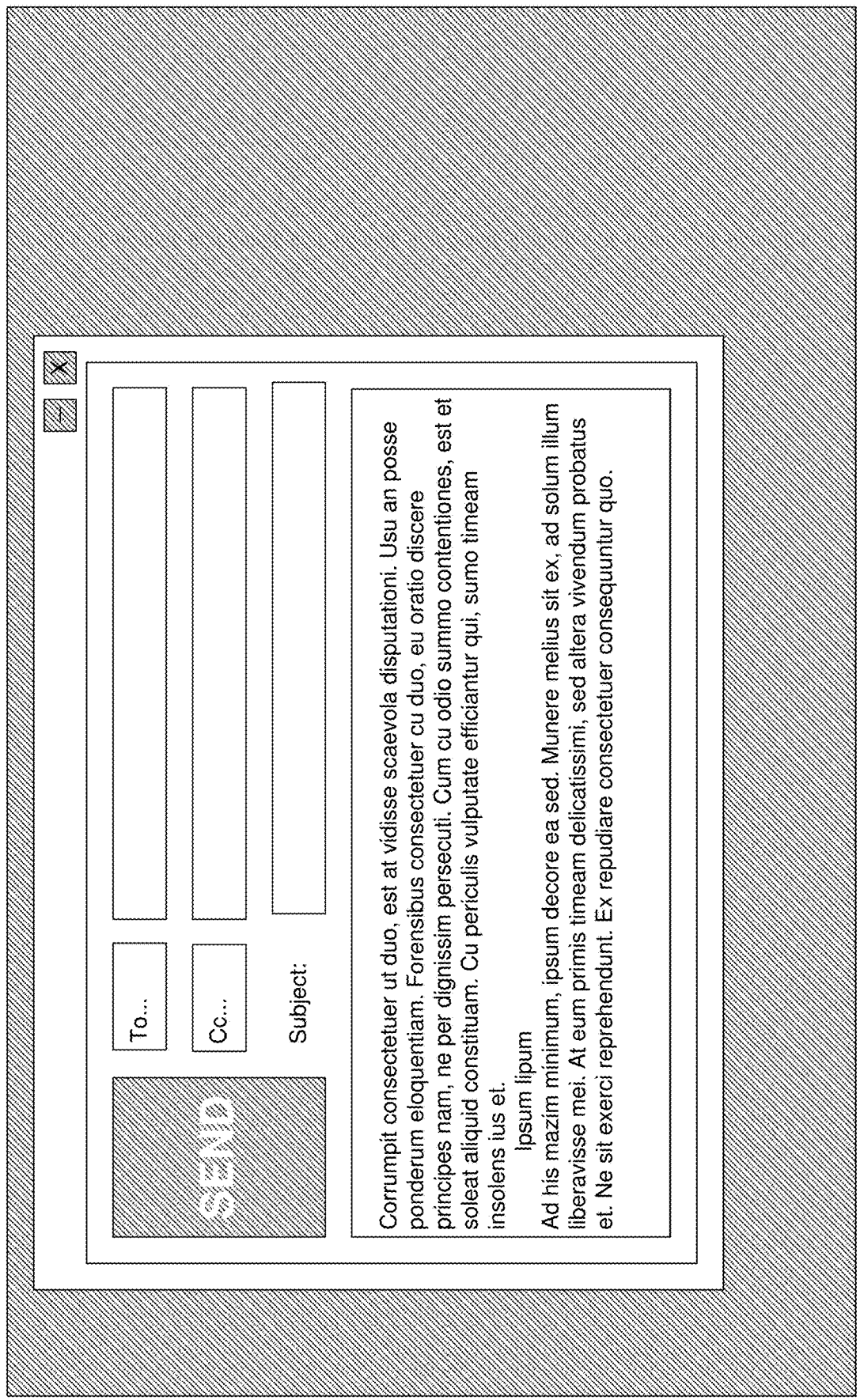
FIG. 13 illustrates yet another embodiment of a digital message with at least one digital messaging function disabled.

FIG. 13 illustrates yet another embodiment of a digital message with at least one digital messaging function disabled. In particular, an ability to send the digital message has been disabled along with an ability to access any other functionality or applications on the computing device as well as an ability to minimize or close the instant window. The illustrated embodiment includes a visual indicator that other functions of the device are disabled, although this is not required.

Figure 14:
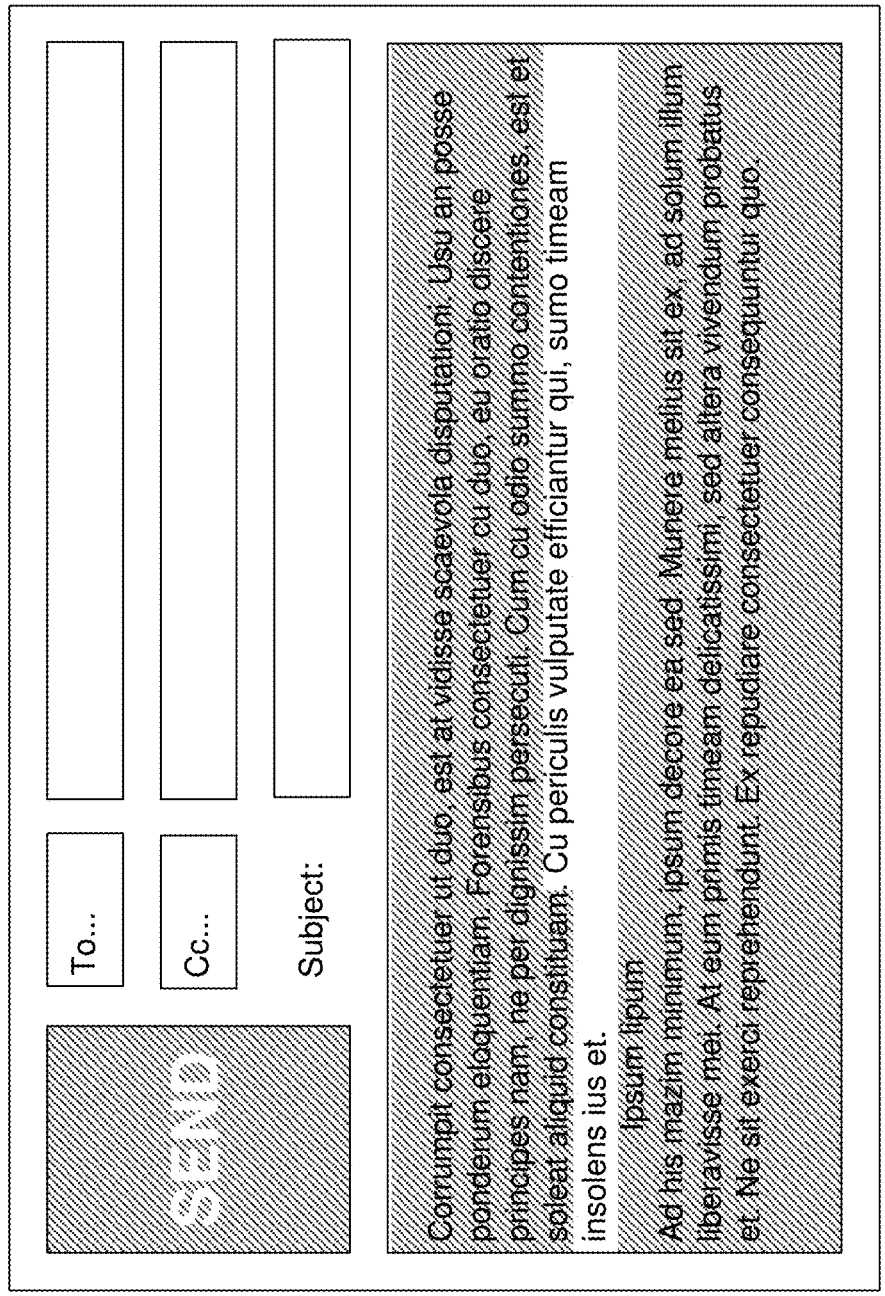
FIG. 14 illustrates yet another embodiment of a digital message with at least one digital messaging function disabled.

FIG. 14 illustrates yet another embodiment of a digital message with at least one digital messaging function disabled. In particular, an ability to send the digital message has been disabled along with an ability to edit non-flagged text or to add text to the digital message. In other words, the user is only able to edit the flagged text in this embodiment. In this illustration, flagged text is that text that is not overlapped with a cross-hatched background; non-flagged text includes a darkened or cross-hatched background.

Figure 15:
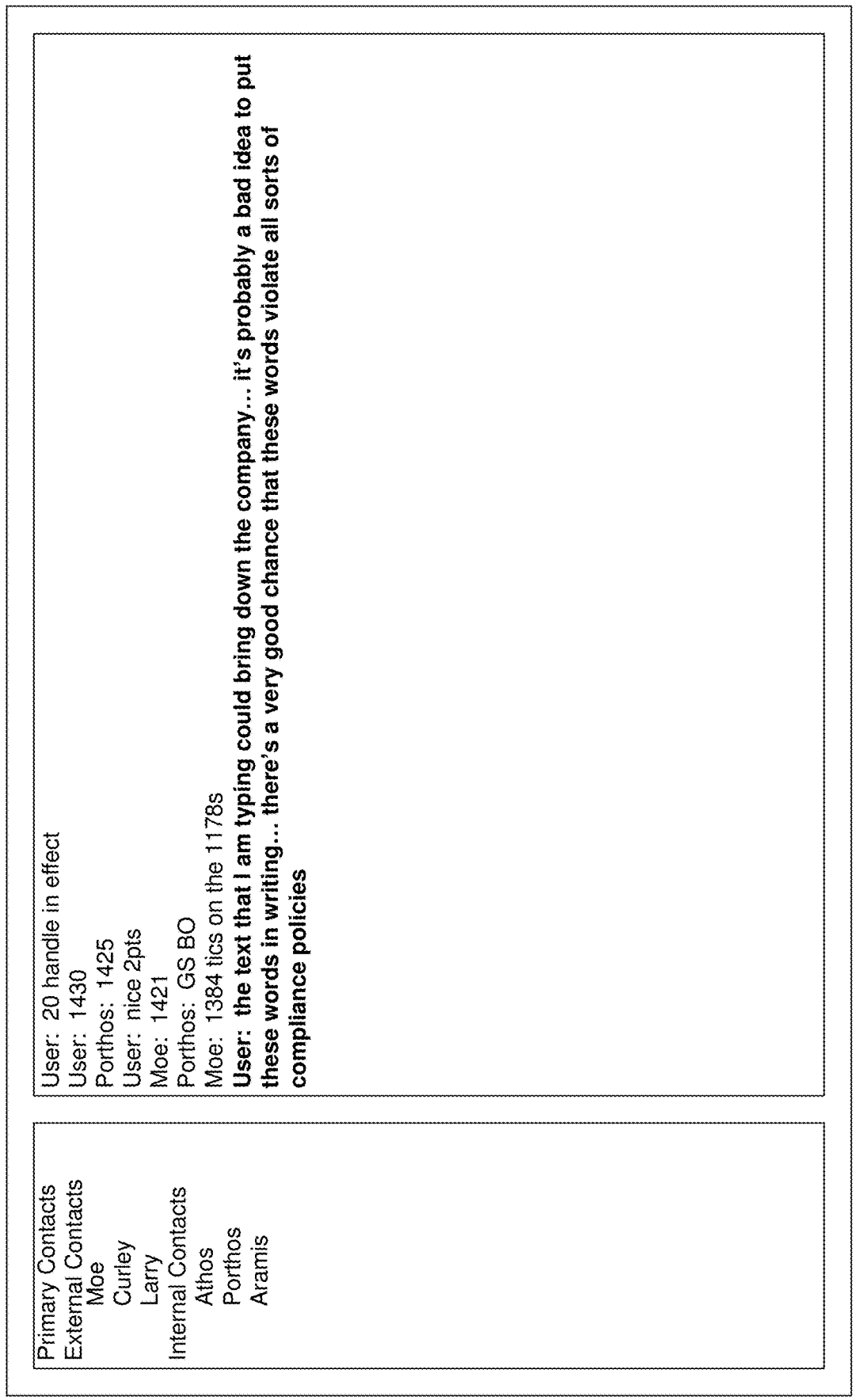
FIG. 15 illustrates an embodiment of a digital messaging platform with at least one digital messaging function disabled.

FIG. 15 illustrates an embodiment of a digital messaging platform with at least one digital messaging function disabled. The illustrated embodiment can have instant messaging or chat room functionality and can show contacts, other users, and/or various chat rooms in one window and a chain of instant messages in another window, although these features and the illustrated arrangement are not required. The User's previous digital messages can be seen along with digital messages from other users (e.g., Porthos and Moe). The User has entered text that has been flagged as a potential violation of compliance policy or laws (for instance as determined by the compliance violation operation 104 in FIG. 1). The flagged text has also been highlighted. Although not illustrated, the ability for this digital message to be sent has been disabled. For instance, pressing the "enter" or return key or giving a send or transmit voice command may have no effect as these functions may have been disabled. As such, the offending message cannot be sent and hence cannot be logged or create a violation. The disabling may carry on until the User corrects the potentially violating text. Alternatively, a "send" button, or various other functionality that is not illustrated or not visible in the illustration, may be disabled as a result of the potentially non-compliant text being flagged.

Figure 16:
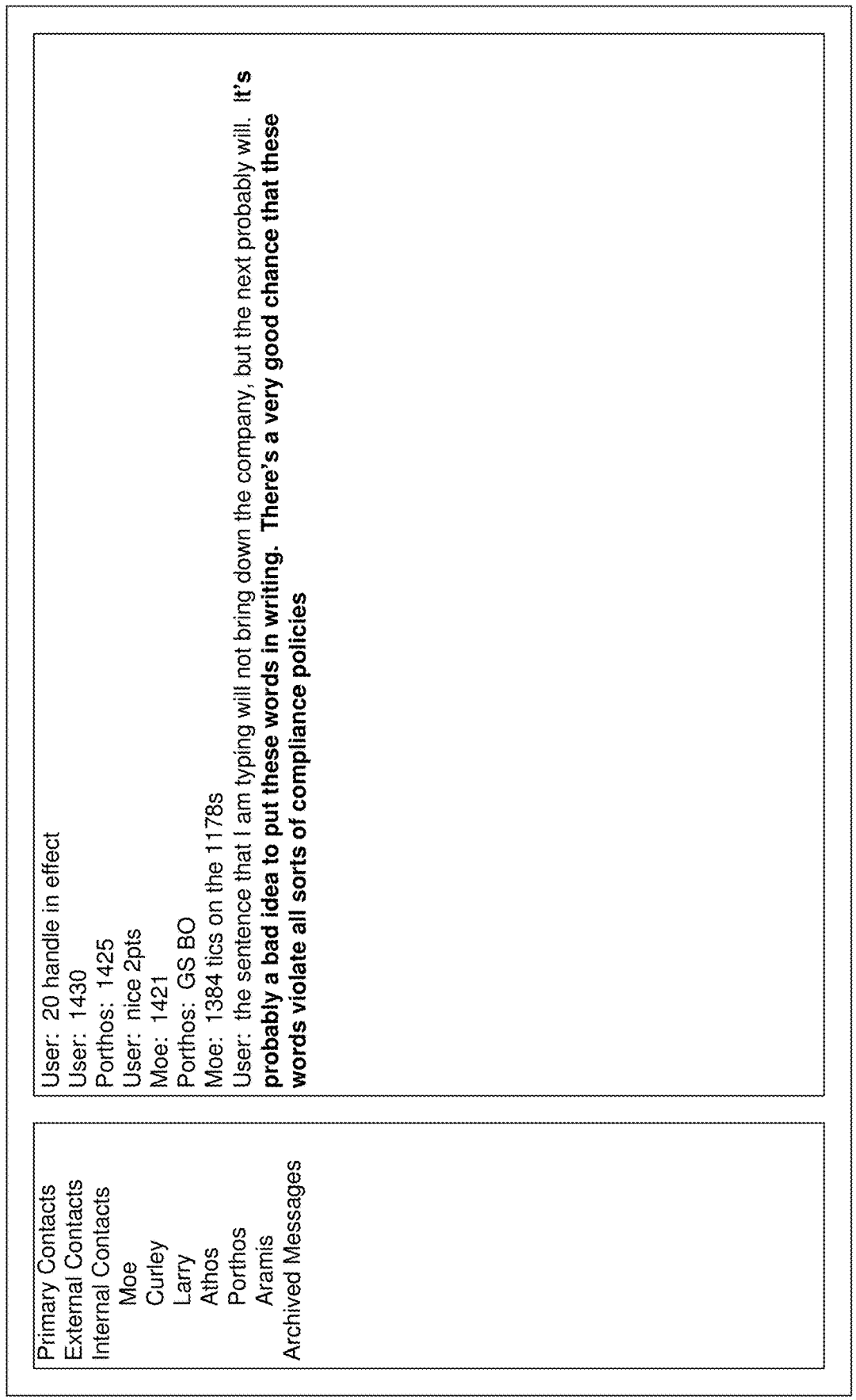
FIG. 16 illustrates another embodiment of a digital messaging platform with at least one digital messaging function disabled.

FIG. 16 illustrates another embodiment of a digital messaging platform with at least one digital messaging function disabled. Like FIG. 15, the illustrated embodiment can have instant messaging or chat room functionality and can show contacts, other users, and/or other chat rooms in one window and a chain of instant messages in another window, although these features and the illustrated arrangement are not required. The User's previous digital messages can be seen along with digital messages from other users. The User has entered text that has been flagged as a potential violation of compliance policy or laws (for instance as determined by the compliance violation operation 104 in FIG. 1). The flagged text has also been highlighted. Although not illustrated, the ability for this digital message to be sent has been disabled. In this embodiment, only a portion of the User's draft digital message has been identified as being a possible compliance violation, and thus only the flagged text has been highlighted. In some embodiments, the entire message may be editable, but not sendable, while in other embodiments, the User may only modify the flagged text while editing of the non-flagged text is disabled.

In other embodiments of the disclosure, systems, methods, and apparatus are described for preventing manifestation of risky ideas in messages documents or other tangible forms that can be subpoenaed by a court. Compliance and other violations become a risk when a non-compliant idea is manifested in a document, message, or other format that a court can gain access to. For instance, even if an e-mail is not transmitted, a draft of that message may be saved to a server if the message is not deleted in a certain amount of time. Thus, even though this message is never sent, a court could conceivably obtain a copy of the message via subpoena. As another example, a non-compliant idea (e.g., a sexually harassing commentary) can become problematic when written in a WORD document and saved, even if the document never leaves a user's computer (e.g., via e-mail). In other words, compliance risks arise from manifestation of a non-compliant idea in a document rather than merely from transmission of a non-compliant message. Therefore, increased risk mitigation is provided by systems, methods, and apparatus that prevent manifestation of flagged ideas, not just via prevention of message transmission. Although much of this application has focused on prevention of message transmission, in other embodiments, risky ideas can be flagged in any document or other manifestation of an idea before the manifestation of the idea is saved to non-volatile memory (e.g., a server, device hard drive, flash storage, etc.). Any ability for the manifestation to be saved can then be disabled. For instance, some document and message creations platforms include auto-save functions (e.g., MICROSOFT WORD and GMAIL), and these can be disabled the moment that a risky idea is identified. Further, any user-initiated save features can be disabled (e.g., a "Save" button can be disabled). Once any ability to save the manifestation of the idea is disabled, the risky idea or parts of the risky idea can be removed (e.g., deleted, censored, covered up, etc.). In some cases, a user can be prompted to remove or change the risky idea on their own. In some cases, editing functions can be disabled or limited. For instance, the ability to add additional text or change windows may be disabled, and prompt may appear requiring the user to read a warning and press a "delete" or other button that removes the risky idea from a document or other manifestation of a risky idea. In other cases, the prompt may include an education message intended to train the user to avoid risky ideas in the future. In other cases the prompt can include statistics showing a risk score, trends in risk scores, etc. meant to show the user how his/her actions have improved or degraded over time.

Further disclosed herein are systems, methods, and apparatus for identifying manifestations of ideas that pose a compliance, policy, or legal violation risk. In some embodiments, such a system can be partially embodied in a policy or compliance engine. A policy engine can be used to identify documents or other manifestations of ideas that pose a compliance, policy, or legal violation. Documents can include any manifestation of an idea in a form that can be saved to non-volatile memory. For instance, an instant message, cellular text message, web blog post, a forum post, a text document, a PDF, a spreadsheet, an executable, a database file, monitored instant message, non-monitored instant message, web traffic, or transcribed phone call, are just a few non-limiting examples of documents, and they meet this definition even before they are saved to non-volatile memory, and even if they are never saved (although manifestations of ideas can take many forms, for the purposes of this disclosure, all such manifestations will be hereafter referred to as "documents").

Figure 20:
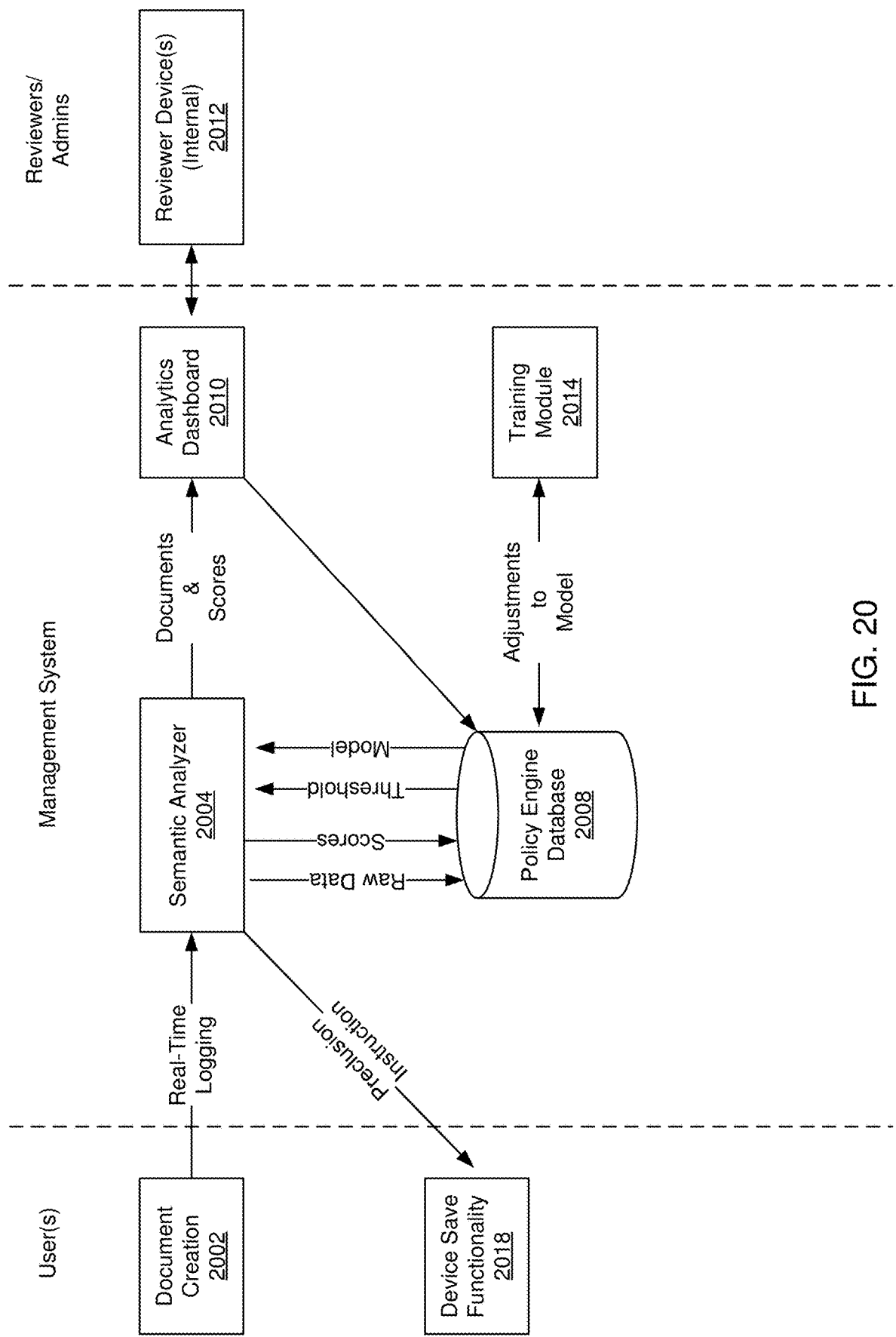
FIG. 20 illustrates an embodiment of a system employing a policy engine to identify manifestations of ideas that pose a compliance, policy, or legal violation risk.
Figure 24:
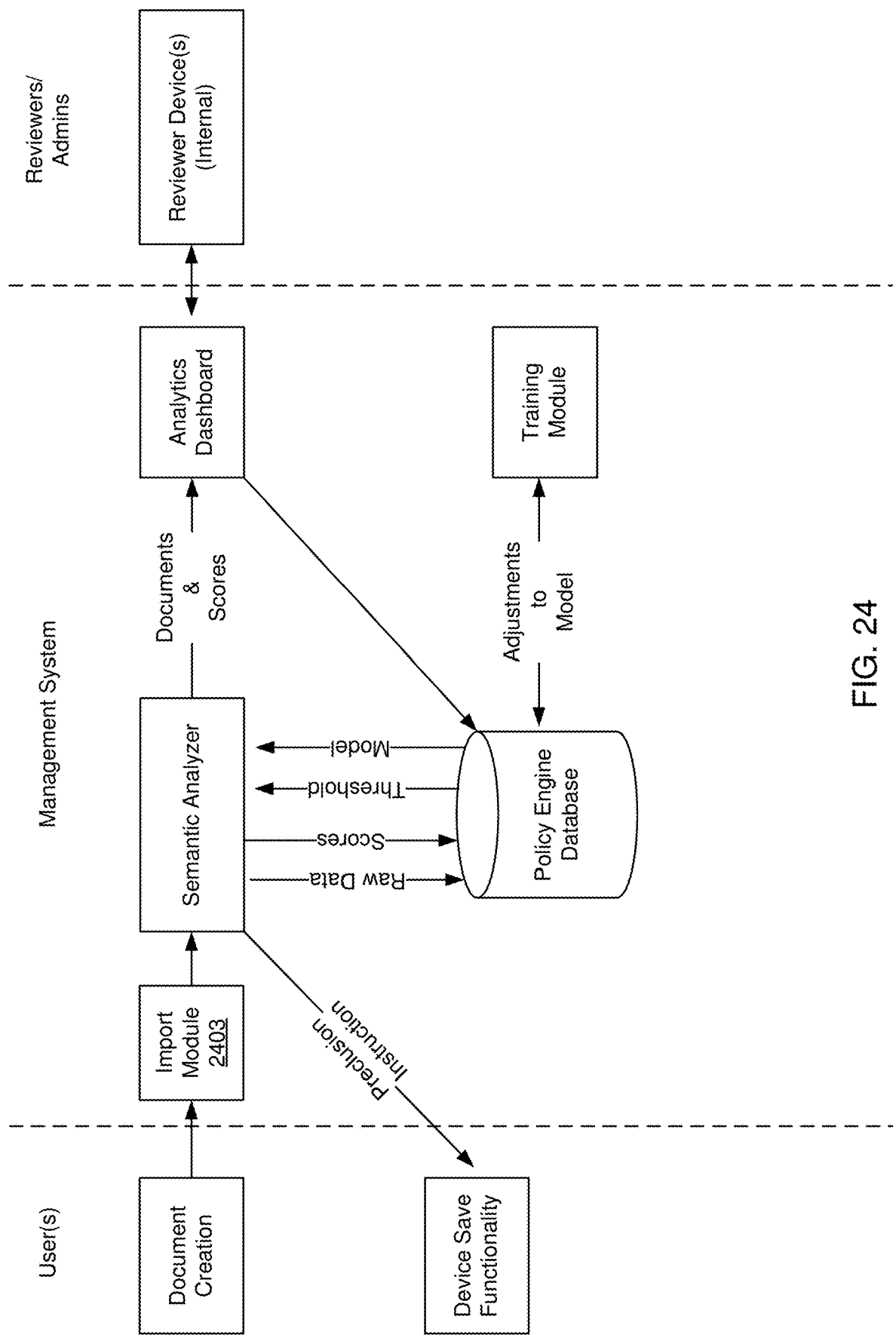
FIG. 24 illustrates another embodiment of a system employing a policy engine to identify manifestations of ideas that pose a compliance, policy, or legal violation risk.

FIG. 20 illustrates an embodiment of a system employing a policy engine to identify manifestations of ideas that pose a compliance, policy, or legal violation risk. A user, using a user device, can create or generate a document (2002). This can include drafting an e-mail or instant message, transcribing a telephone conversation or dictating a message, or entering language into a document (e.g., a blank document or a template), to name a few non-limiting examples. Documents can also be received as e-mail journaling, XML exports, Direct MYSQL connections, APIs from a communication provider, OS accessibility features. The document can be logged in real-time or imported (e.g., via an import module 2403, see FIG. 24) to a semantic analyzer 2004. The semantic analyzer 2004 can scan the document for context and content as described above relative to preclusion of message transmission. In some instances, the document can be parsed into words and symbols as part of the analysis. Sequences of words, or words and symbols, can be identified by the semantic analyzer 2004 as ideas. The semantic analyzer 2004 can access a policy model stored in a policy engine database 2008 as well a violation threshold. The policy model can account for policy violations (e.g., sexual harassment, racism, sexism, age discrimination, EEOC, Civil Rights, company conduct, confidentiality, time expenditures, etc.), and compliance violations (e.g., Dodd-Frank, CAN-SPAM, CAN-SPAM, EEOC/Civil Rights, Company Conduit, Confidentiality, Time Expenditures, and any other set of rules, either public, or private and unique to a given company). The semantic analyzer can then assign a score to each of the ideas using the policy model and total the scores. If the total of the scores for the first document surpasses the violation threshold, then the semantic analyzer 2004 can disable save functionality of the user device creating the first document. This can include sending a preclusion instruction to the user device causing the user device to disable any ability to save the first document (2018). In some embodiments, the semantic analyzer 2004 may also instruct the user device to prevent transmission of the first document, disable further editing of the first document, or prompt a user of the user device to edit or fix the risks found in the first document. In some embodiments, the semantic analyzer 2004 can also request a screenshot of the document before any further editing of the document is possible.

The semantic analyzer 2004 can also save each document and/or screenshot to the policy engine database 2008 along with the score assigned to each document. The entire document can be written to the policy engine database 2008, or the document in parsed form can be stored. In other embodiments, entire documents as well as parsed forms thereof can be stored. In some embodiments, writing to the policy engine database 2008 can use a write once read many (WORM) protocol. In some embodiments, writing policy engine database 2008 can also or alternatively use 256-bit AES encryption or other form of encryption. The semantic analyzer 2004 can also assign meta tags to each document or communication and can include a policy review and a context (across multiple platforms). The meta tags can enhance the ability to search documents at a later time. In some embodiments, documents can be indexed by user, or content extracted from a document can be stored in the policy engine database 2008 along with a score and can be indexed by user.

All documents, or only those documents flagged as constituting a policy, compliance, or legal violation risk, can be passed to an analytics dashboard 2010. The analytics dashboard 2010 can be accessed by one or more policy reviewers via corresponding reviewer devices 2012. Policy reviewers can provide responses, and these responses can indicate a policy user's assessment of risk of the total of the scores assigned to the first document. This can include flagging false positives, assigning a human-generated score to the first document, or affirming the flagging or score assigned by the semantic analyzer 2004. Flagging false positives can train the policy model to look for other risk identifiers other than the ones it may have used in the first instance. For instance, the policy model may turn to speech patterns, sender/receiver influences, syntax, word choice, message length, time of day, or other patterns instead of the one(s) used in the first instance, or change the weighting that these factors have on the score for a document. Policy users may also change scores assigned by the semantic analyzer 2004.

A single policy reviewer or many policy reviewers can be used to analyze the documents. The policy reviewer(s) can be part of the entity or company where the document was created (e.g., FIG. 20), or can include some policy reviewers internal to and some external to the entity or company (e.g., FIG. 21-23). In some instances, this operation can be farmed out to human resources and compliance "turks" such as those available via the Amazon Mechanical Turk platform. Policy reviewers can be sourced from different organizations, where policy reviewers from a given organization analyze flagged documents or communications associated with their organization. This maintains privacy between different organizations even though the policy engine learns from input from all policy reviewers. In another embodiment, the documents or communications can be anonymized, such that policy reviewers can analyze flagged documents or communications regardless of the source. For instance, policy reviewers from General Electric could be reviewing documents or communications from IBM and Apple without the source of those documents or communications being apparent to the General Electric policy reviewers.

The dashboard can prompt a user to score or critique the policy engine's performance. In particular, one or more policy reviewers are presented with the documents or screenshots of the documents, and asked to judge whether the semantic analyzer 2004 appropriately flagged or scored a document. In other cases, a policy reviewer may be asked to assign a qualitative score to the semantic analyzer's 2004 scoring (e.g., 1-10 or one to three stars). For instance, where a policy reviewer does not believe that a document should have been flagged as presenting a potential violation, the user can assign a score of 0, whereas the policy reviewer may assign a score of 1 to a document that appears to be appropriate for flagging. These human results can then be saved in the policy engine database 2008 and a training module 2014 can compare the policy reviewer scores to the machine-generated scores saved to the policy engine database 2008.

In some embodiments, policy reviewers may assign binary assessments to the documents either agreeing or disagreeing with the risk assessments performed by the semantic analyzer 2004 (e.g., indicating flagged communications as "hits" or "misses"). Alternatively, the policy reviewers can assign a score to the documents, thereby indicating their agreement or disagreement with the semantic analyzer's 2004 assignment of scores to documents.

In some embodiments, a policy reviewer or an administrator can customize a lexicon or phrase template that is part of the policy model.

The analytics dashboard 2010 can then receive these responses from the one or more policy reviewers, and these responses can be stored in the policy engine database 2008, and then accessed by the training module 2014 to train the policy model. This training can use machine learning and/or can use the responses as one of a plurality of inputs. The training can form an updated policy model.

As the model is trained, additional rules are created, and existing rules may be modified. For instance, where users return scores that indicate an accuracy of flagging certain content. In the example where users merely flag content at their discretion, rather than scoring the machine-flagged content, the training module 2014 can compare the similarity of instances of machine flagging and human flagging to train the model. As the model is trained via responses from the policy reviewers, the rules make up the policy model may become more complex and accurate.

Subsequent documents can then be analyzed using the updated policy model. In particular, the semantic analyzer 2004 can receive a second document and access the updated policy model and assign scores to ideas parsed from the second document. In this way, the policy model can be tailored to a particular organization. However, where the policy model is also partially trained by responses from policy reviewers external to the entity or company, the policy model may only be partially tailored to the entity or company. This is an optional modification to the model training and may make use of a so-called "crowd" of policy reviewers outside of the entity or company.

Over time, and as a greater number of communications are analyzed by the policy engine, and feedback from the policy reviewers is provided back to the policy engine database 2008, the accuracy of the semantic analyzer 2004 increases. As the accuracy of the model increases the policy reviewers will indicate fewer and fewer "misses" or assign more and more accurate scores to the semantic analyzer's 2004 flagging. Eventually, fewer policy reviewers will be needed and in one instance, the policy reviewers can be completely removed from the loop as the model becomes smart enough that any policy user would merely indicate "hit," and thus not have a role. In practice, the policy reviewers may continue to analyze the semantic analyzer's 2004 scores and continually broaden the pool of rules and classifications that the semantic analyzer 2004 can pull from.

In some embodiments, the semantic risk analyzer 2004 can group threads of documents (e.g., instant message threads or e-mail threads) based on a parameter such as time. For instance, threads can be grouped by day. The groups threads can then be saved to the policy engine database 2008 in addition to the isolated documents, or in place of any series of documents that have been grouped.

While the description of FIG. 20 has focused on embodiments where policy reviewers analyze documents and provide responses that are used to train the policy model, in other embodiments, one or more administrators can also access the analytics dashboard 2010 and manually adjust the policy model. For instance, an administrator can manually adjust the lexicons, static phrase templates, dynamic phrase templates, or other aspects of the policy model. They can also manually adjust the violation threshold or scores assigned to specific words, phrases, or types of speech.

The above description has focused on a semantic analyzer 2004 that assesses the risk of a document based primarily on semantics. In other embodiments, the semantic analyzer 2004 may also consider a risk weighting for the user or creator of the document. At the same time, the semantic analyzer 2004 may also consider a risk of a relationship associated with the document (e.g., sender and recipient). In either case, the policy engine database 2008 can include risk scores for individuals and sets of individuals (e.g., sender and recipient, multiple users jointly creating a document). As the semantic analyzer 2004 assigns a score to a document, a factor in this calculation can be the risk associated with the document creator, and/or a set of persons associated with the document. For instance, a user with a history of sending racist e-mails to company clients may be assigned a higher-than-average individual risk score, and this individual risk score may weight all scores assigned to documents created by this user. Thus, a phrase that would not raise flags for most users, may raise a flag (e.g., result in a document score surpassing the violation threshold) for this user due to his higher individual risk score. Individual risk scores can be assigned based on an individual's history of document creation (automatically: as metadata that the sentiment analyzer 2004 saves to the policy engine database 2008; manually: as metadata that a policy reviewer or administrator inputs through the analytics dashboard 2010). The sentiment analyzer 2004 can look at metadata in the document, or text entered into the document to determine the author(s), sender, or recipient(s). The sentiment analyzer 2004 can apply individual risk score as a weight to the score otherwise assigned to a document ("baseline score"). For instance, an individual risk score of 30 may cause the baseline score of a document to be multiplied by 130%. In some embodiments, the individual risk score may only be applied to the baseline score if the individual risk score exceeds an individual risk threshold.

In addition to or alternatively to individual risk score, the policy model can include relationship risk scores. The semantic analyzer 2004 can consider a relationship between a sender and receiver of a document (e.g., instant messages and e-mail or a transcribed voice conversation), between persons sharing creation of a document, or any other relationship. The sentiment analyzer 2004 can look at metadata in the document, or text entered into the document to determine the author(s), sender, or recipient(s). This relationship risk score can also be a factor in calculating the score for a document. For instance, an instant message having a sentiment or idea implying a potentially unlawful stock trade may carry greater weight if sent between two parties having a history of risky trades. In other words, the relationships found in a document can influence the chances of a document being flagged or exceeding the violation threshold, and thus the disabling of saving and/or transmission functionality. In some embodiments, the relationship risk score may only be applied to the baseline score if the individual risk score exceeds an individual risk threshold.

While policy reviewers can influence or set individual and relationship risk scores during review of a document, an administrator can also access the policy engine database 2008 independent of document review, and adjust, influence, or set these scores. For instance, an administrator may increase a user's individual risk score as a result of a human resources violation—an event that evidences increased risk for that user, but that would not otherwise be included in the training based on automated means and policy reviewer responses. Alternatively, the administrator could add metadata to the policy engine database describing or detailing events that otherwise are not captured by the policy engine database. For instance, the administrator could enter as metadata a statement verbally made by an employee. The administrator may not take any action directly related to the individual's risk score, and instead the training model 2014 may note the entry of this metadata and train the policy module based on its analysis of this metadata.

The sentiment analyzer 2004 can also apply weighting to the baseline score based on a document or user's proximity to problematic trade collections (hereinafter referred to as "hotspots"). This may involve tracking of trade data in addition to sentiment of documents and user and relationship risk.

As with sentiment, when documents are presented to policy users via the analytics dashboard 2010 and policy reviewer devices 2012, policy reviewers may further assess individual risk and relationship risk. For instance, a policy reviewer may assign an individual risk score to a creator of a document being reviewed. A policy reviewer may assign a relationship risk score to a pair of sender and recipient or to a group of shared document creators. At the same time, if the individual of set of users already have risk scores and/or relationship scores assigned to them, these scores may be displayed via the analytics dashboard 2010, and the policy reviewers may have the option to adjust these scores as part of their review of a document.

The management system illustrated in FIG. 20 can be implemented on an entity or company's internal network or premises, remotely, or via a combination of internal network and the cloud. Any of the four elements of the management system can be local or remote to an entity or company's premises. In some cases, the functionality of the functional blocks making up the management system can be distributed between local and remote hardware. In some cases, the functionality of the functional blocks making up the management system can be distributed between internal and cloud based network hardware/services.

Figure 21:
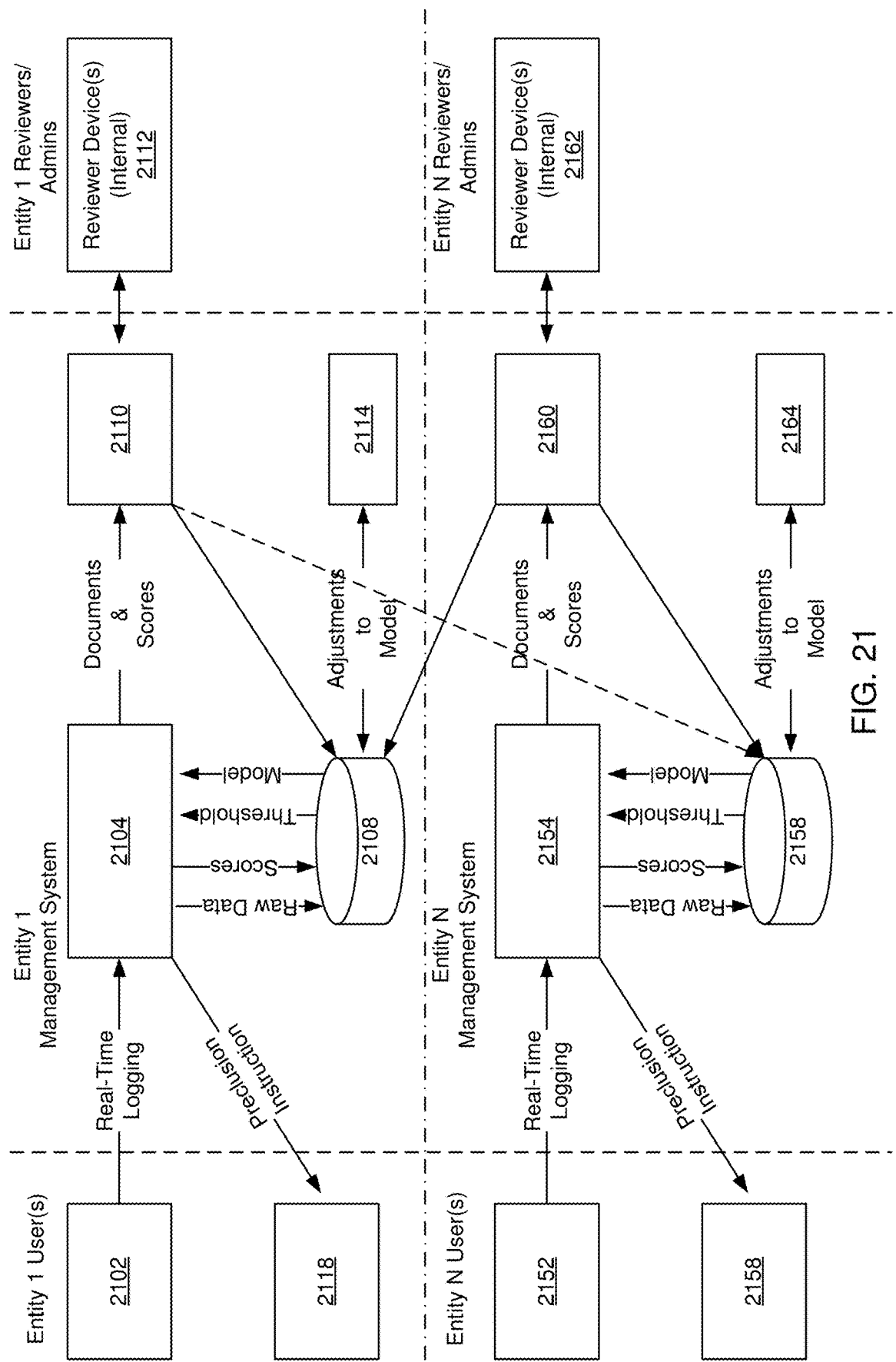
FIG. 21 illustrates another embodiment of a system employing a policy engine to identify manifestations of ideas that pose a compliance, policy, or legal violation risk.
Figure 22:
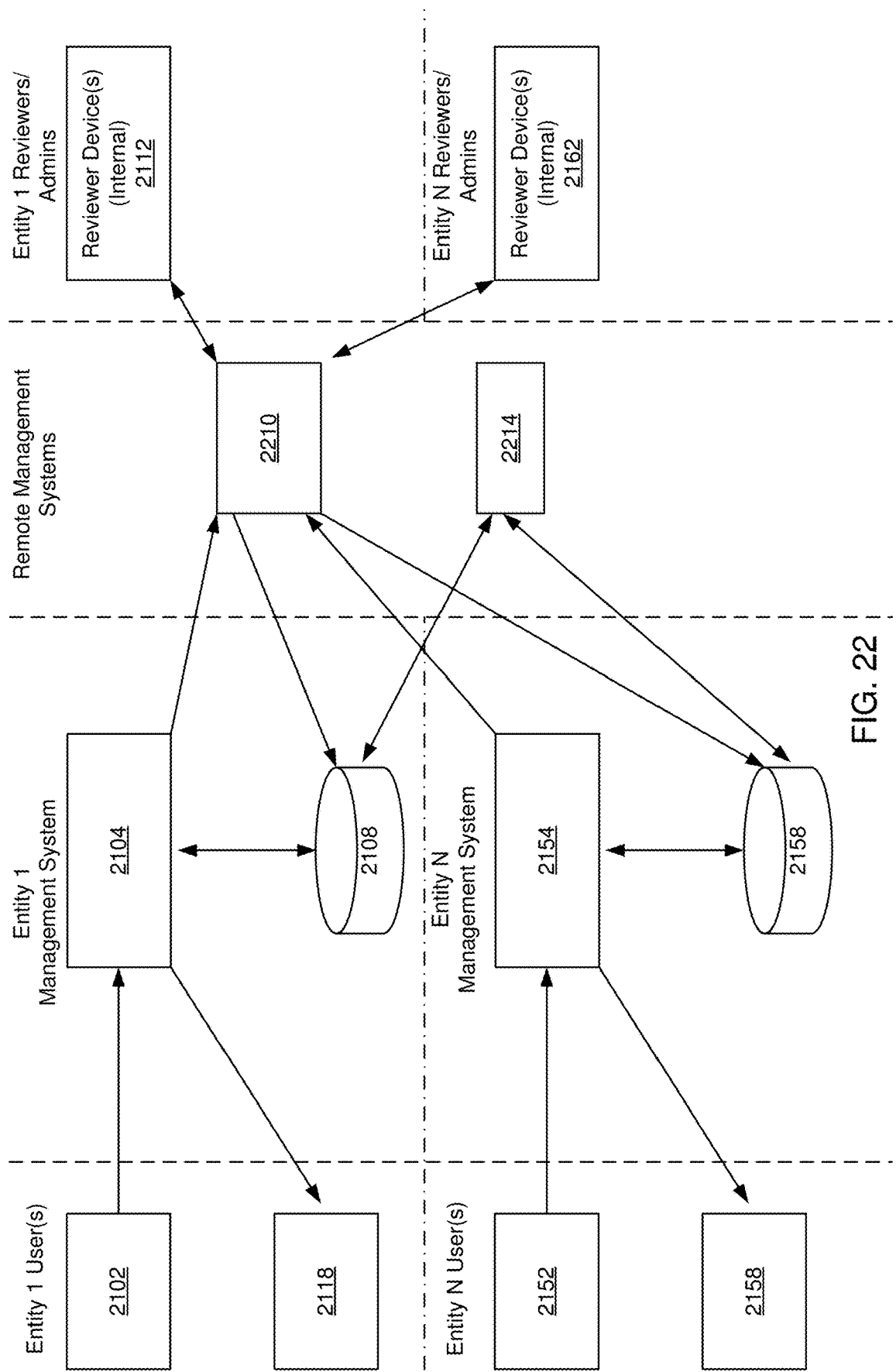
FIG. 22 illustrates another embodiment of a system employing a policy engine to identify manifestations of ideas that pose a compliance, policy, or legal violation risk.
Figure 23:
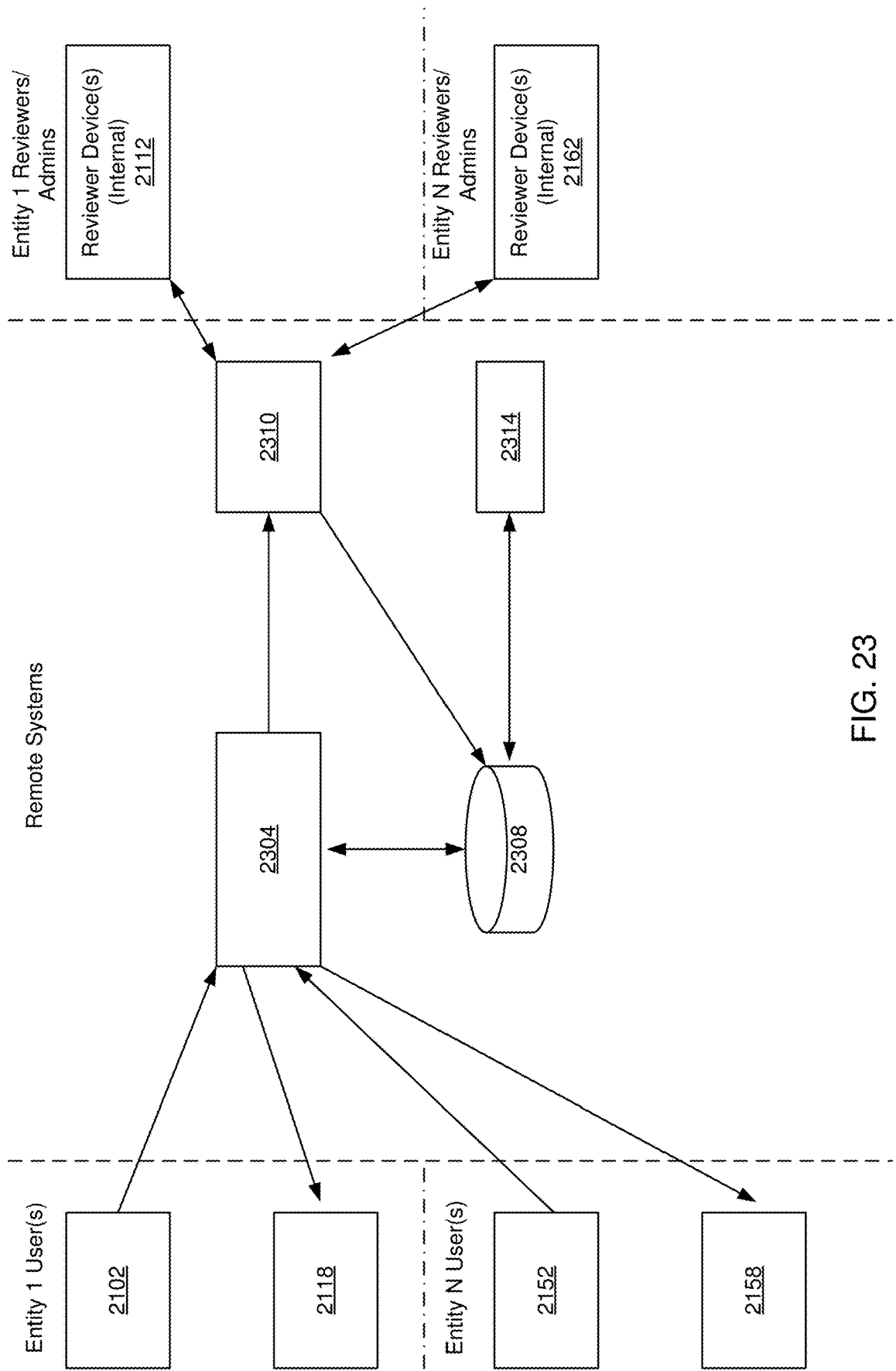
FIG. 23 illustrates another embodiment of a system employing a policy engine to identify manifestations of ideas that pose a compliance, policy, or legal violation risk.

FIGS. 21-23 illustrate variations of FIG. 20 where two or more entities or corporations each have a management system, each management system having its own policy model trained for that entity or company. However, in each of these variations, the respective training modules use feedback from policy reviewers internal and external to the entity or corporation to train each policy model. In this way, each policy model is trained in part via internal feedback and in part via external feedback (or the "crowd"). For instance, in FIG. 21 an analytics dashboard 2160 for entity N (N representing any positive integer) passes responses from the policy reviewers for Entity N, both to the internal policy engine database 2158 and to entity 1's policy engine database 2108. In an optional embodiment, analytics dashboard 2110 can pass responses from its policy reviewers to both its internal policy engine database 2108 and to an external policy engine database 2158, that of entity N. The training modules 2114, 2164 for each entity then train their respective policy models based on a combination of internal and external feedback. Entity N, represents one or more entities, and in practice N is a large number. Thus, each policy model is trained based on a large number of external responses. At the same time, each training model may weight the influence that internal and external responses have on the training. Thus, even where external responses far outnumber internal responses, the internal responses may still have a greater influence on training a policy model—depending on this weighting (which may be controlled by an administrator).

Where responses are shared between management systems, and thus training is based on both internal and external responses, less than all responses may be shared or at least used in training. For instance, the training may be limited to internal and external responses having common parameters such as common sender/creator, common lexicon, common words, common phrases, etc.

FIG. 22 illustrates a variation of FIGS. 20 and 21 where each entity has its own semantic analyzer 2104, 2154 and its own policy engine database 2108, 2158, but all entities share a cloud-based or remote analytics dashboard 2210 and training module 2214. These can be hosted on a remote management system or systems.

FIG. 23 illustrates a variation of FIGS. 20-22 where each entity shares a set of semantic analyzer 2304, policy engine database 2308, analytics dashboard 2310, and training module 2314.

In the above illustrations of FIGS. 21-23 there is no suggestion that sharing of hardware of functional blocks means that entities necessarily share data. For instance, a single shared policy engine database 2308 may have separate storage for each entity, a separate policy model for each entity, and the shared training module 2314 may use separate training parameters for each entity.

Figure 25:
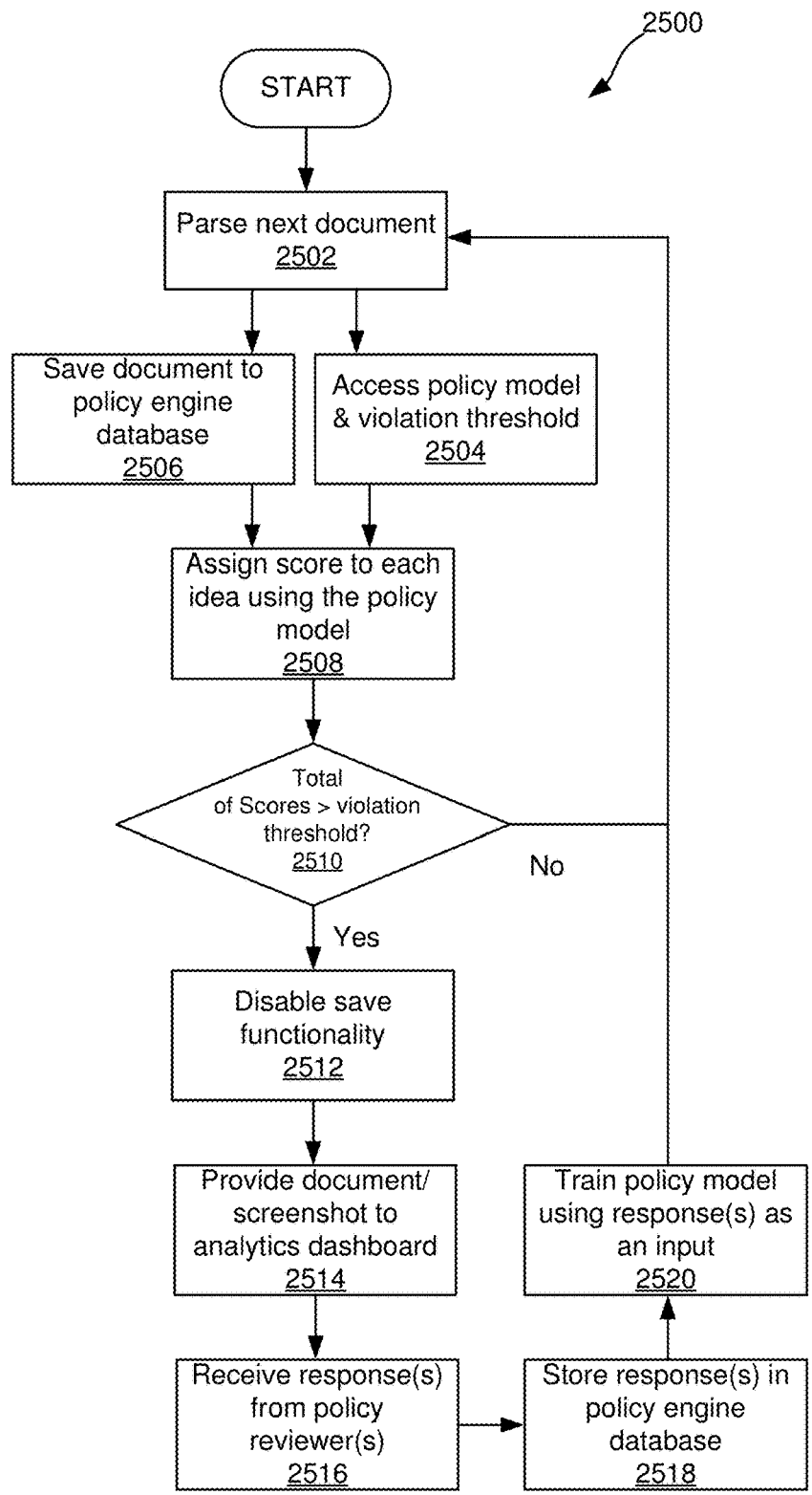
FIG. 25 illustrates a method of precluding ideas that pose a compliance, policy, or legal violation risk from being recorded in non-volatile memory during document creation.
Figure 26:
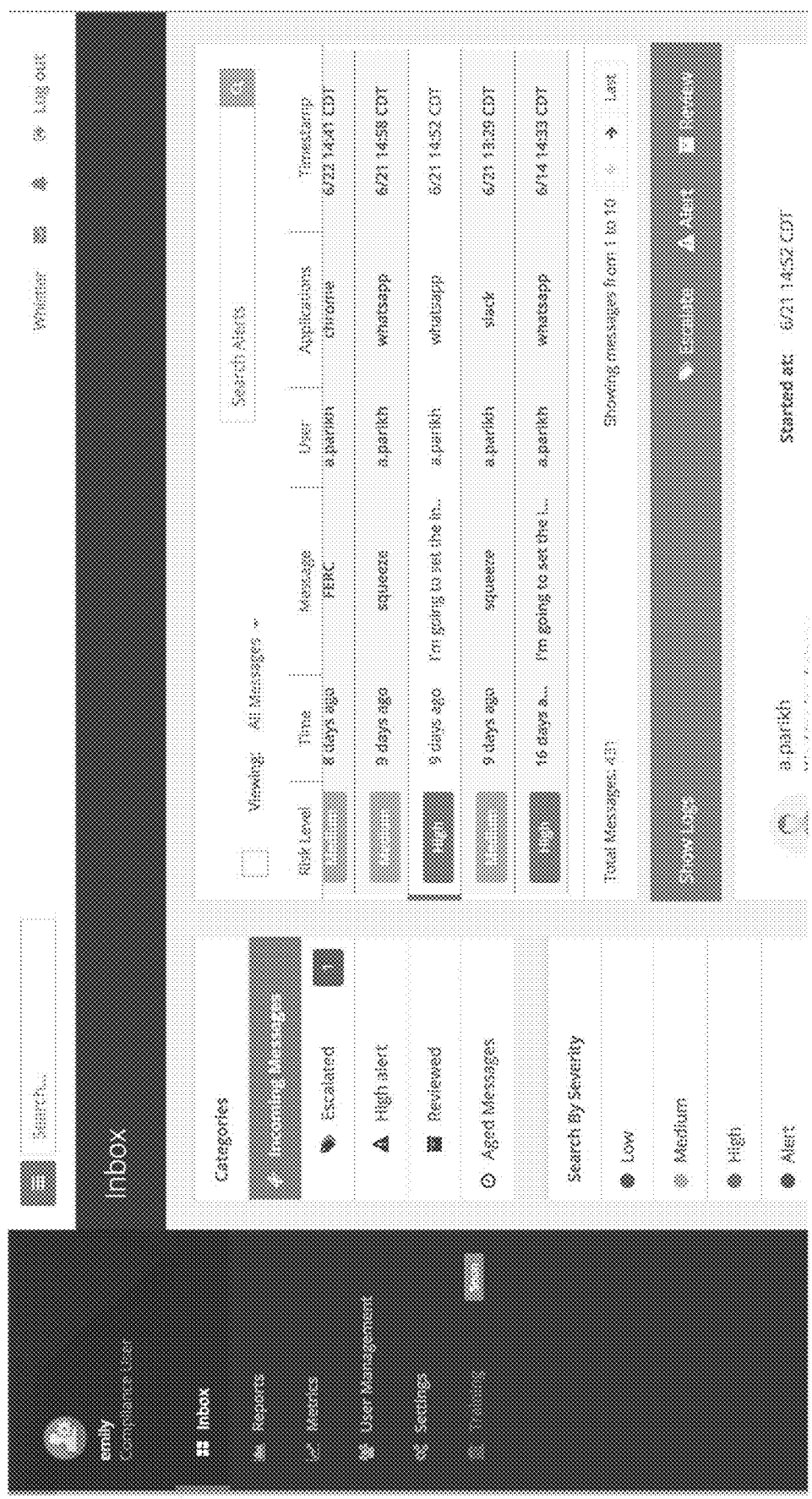
FIG. 26 illustrates an embodiment of a user interface from the analytics dashboard as viewed by a policy reviewer or administrator.
Figure 27:
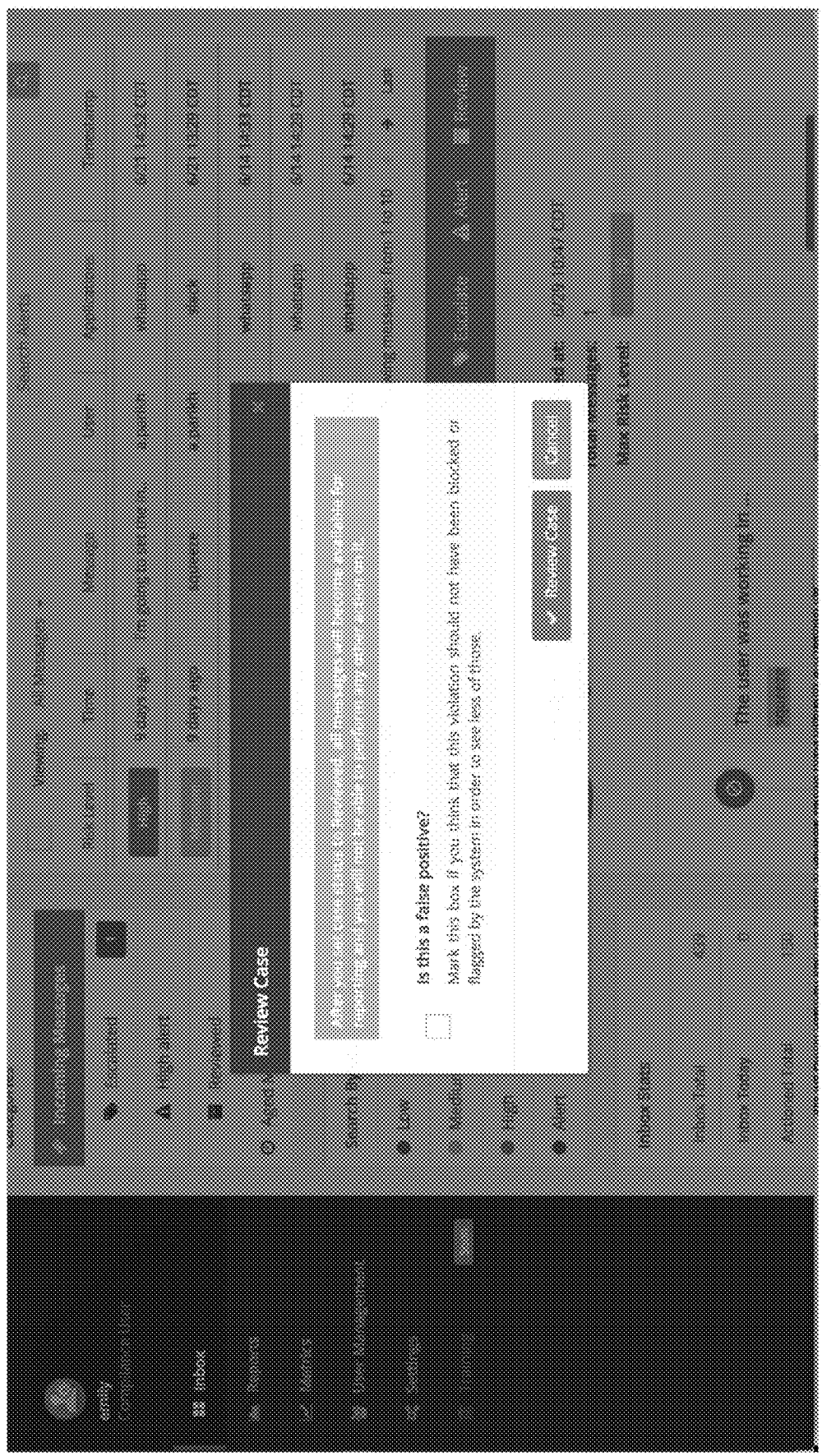
FIG. 27 illustrates an embodiment of a user interface from the analytics dashboard as viewed by a policy reviewer or administrator.
Figure 28:
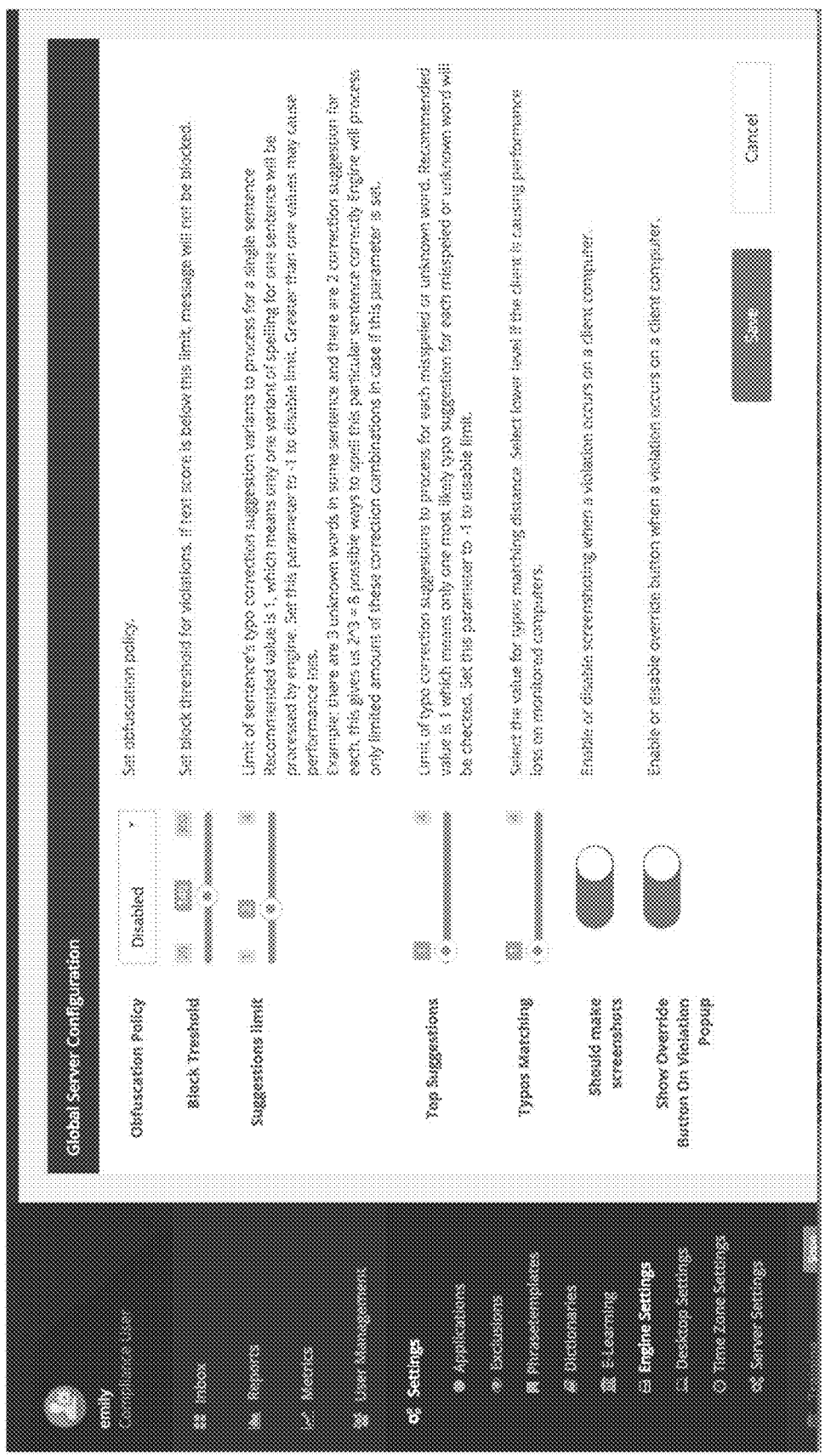
FIG. 28 illustrates an embodiment of a user interface from the analytics dashboard as viewed by a policy reviewer or administrator.
Figure 29:
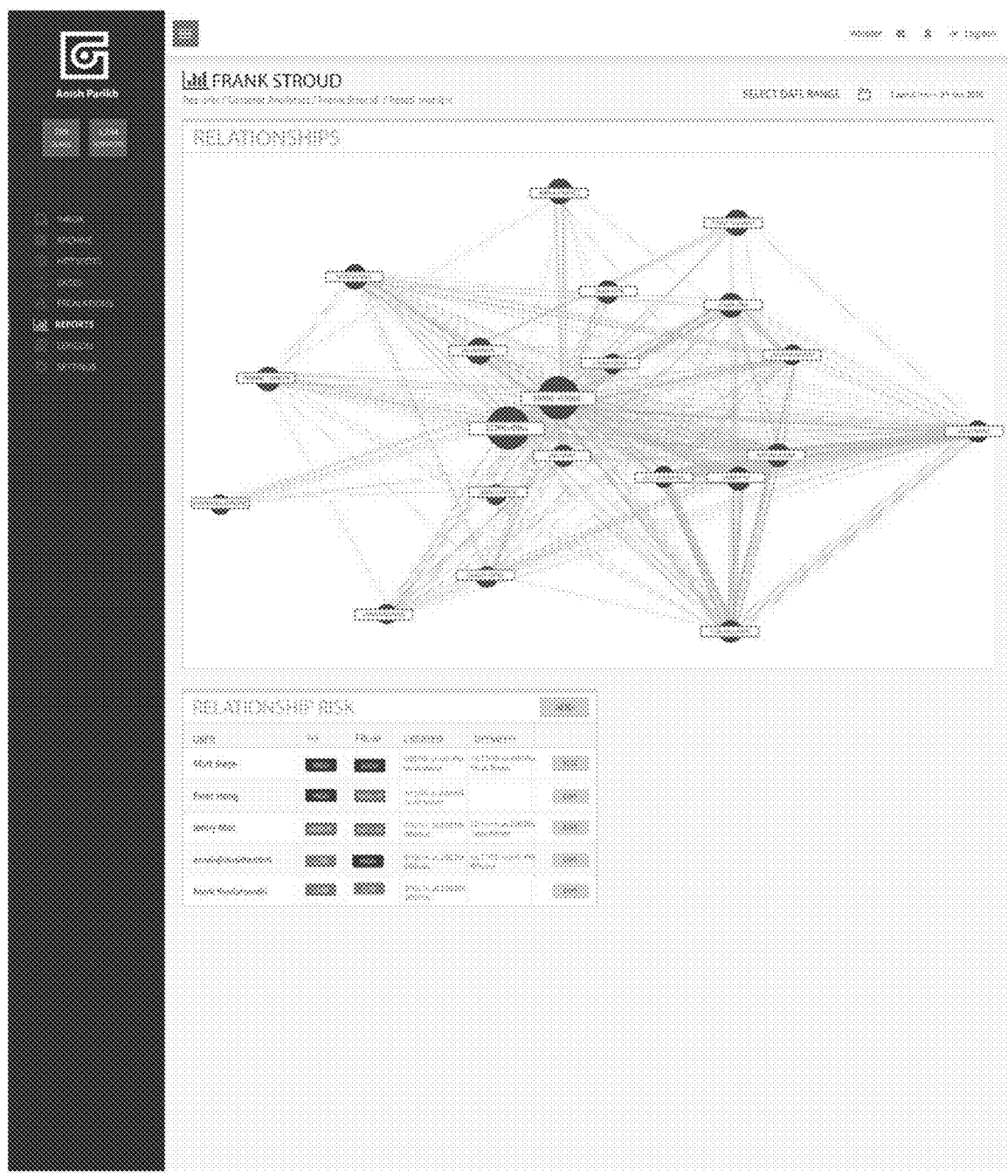
FIG. 29 illustrates an embodiment of a user interface from the analytics dashboard as viewed by a policy reviewer or administrator.
Figure 30:
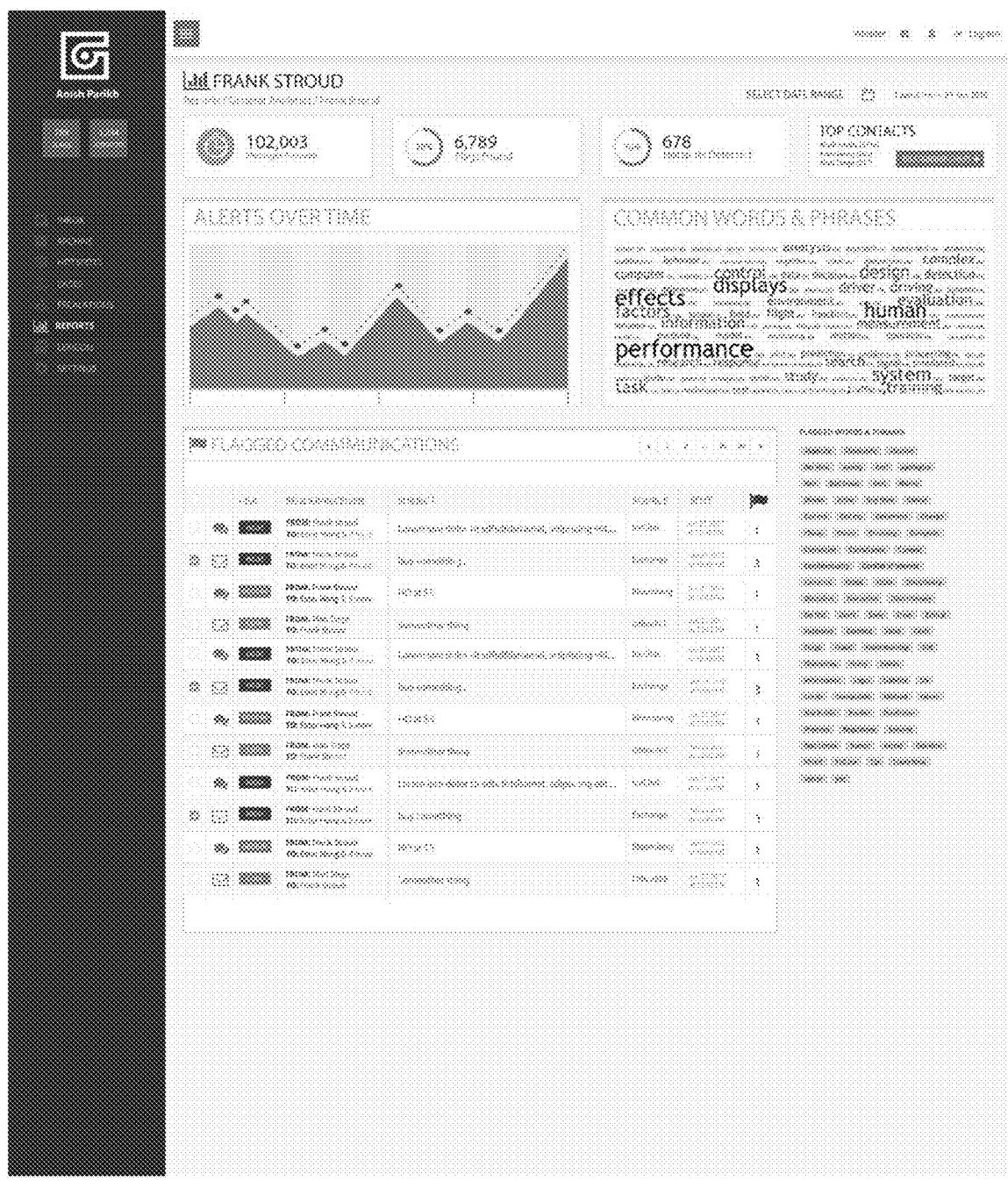
FIG. 30 illustrates an embodiment of a user interface from the analytics dashboard as viewed by a policy reviewer or administrator.

FIG. 25 illustrates a method of precluding ideas that pose a compliance, policy, or legal violation risk from being recorded in non-volatile memory during document creation. The method 2500 can include parsing a first document into words and symbols (block 2502). This can be performed via a parsing module, for instance, of the semantic analyzer 2004. Sequences of words, or words and symbols, in the document can be identified as ideas. The method 2500 can include passing the first document to a semantic analyzer configured to: access a policy model and violation threshold stored in a policy engine database (e.g., 2008) (Block 2504). The semantic analyzer can also be configured to save the document and/or a screenshot of the document to the policy engine database (Block 2506). Using the policy model, the semantic analyzer can assign a score to each idea in the first document (Block 2508) and determine if a total of scores for the ideas in the first document surpass the violation threshold (Decision 2510). If not, then the first document does not pose a significant risk, and no further action is taken; the method 2500 can turn to parsing a next document (Block 2502). However, if the total of the scores for the ideas in a given document does exceed the violation threshold (Decision 2510), then the method 2500 disables save functionality of a device creating the document in question (Block 2512). Save functionality can include any function which would, aside from the disabling, save the document or a portion thereof to non-volatile memory. In other words, disabling save functionality prevents the document or any portion thereof from being recorded in a medium that could be subpoenaed.

The semantic analyzer can then provide the document in question or a screenshot of the document in question, or both, to an analytics dashboard (Block 2514). The dashboard can be configured to present the document to a policy reviewer (or a plurality of policy reviewers, either internal or both internal and external to the entity or company). The method 2500 can then receive a response from the policy reviewer indicating the policy reviewer's assessment of risk of the total of the scores assigned to the document (Block 2516). The response can include an affirmance of the score assigned by the semantic analyzer, an adjustment to the score assigned by the semantic analyzer, or indication that the semantic analyzer's assessment was a false positive, to name a few non-limiting examples. The method 2500 can then store the response in the policy engine database (Block 2518). Based on this response, and optionally other responses, a training module can train the policy model (Block 2520). The training module can use multiple inputs, where the response is one of those inputs. Given the updated policy model, the method 2500 can circle back to parse a next document (Block 2502), and begin analyzing that document and assigning a score to that document based on the updated policy model.

Figure 17:
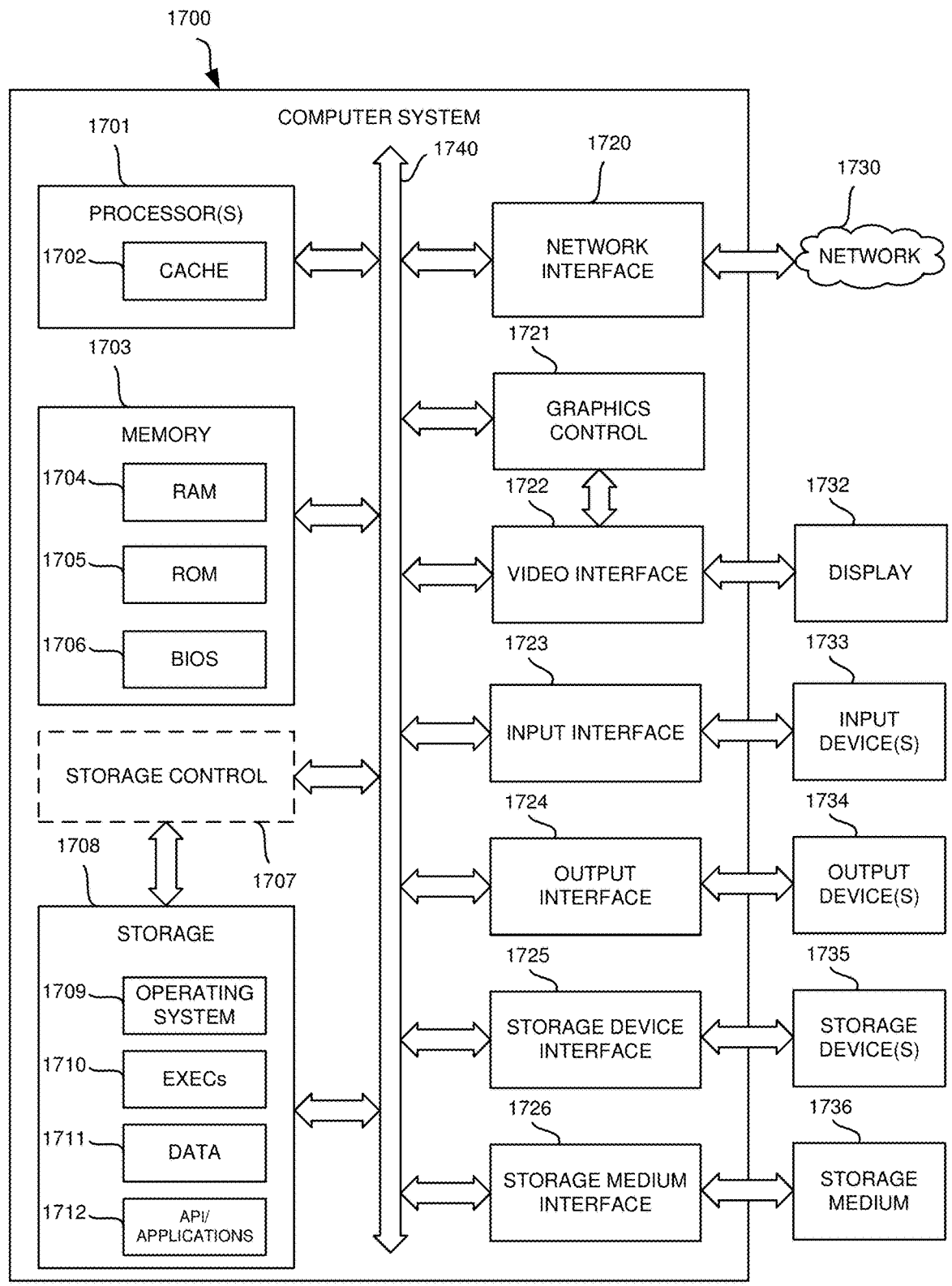
FIG. 17 shows a diagrammatic representation of one embodiment of a computer system.
Figure 18:
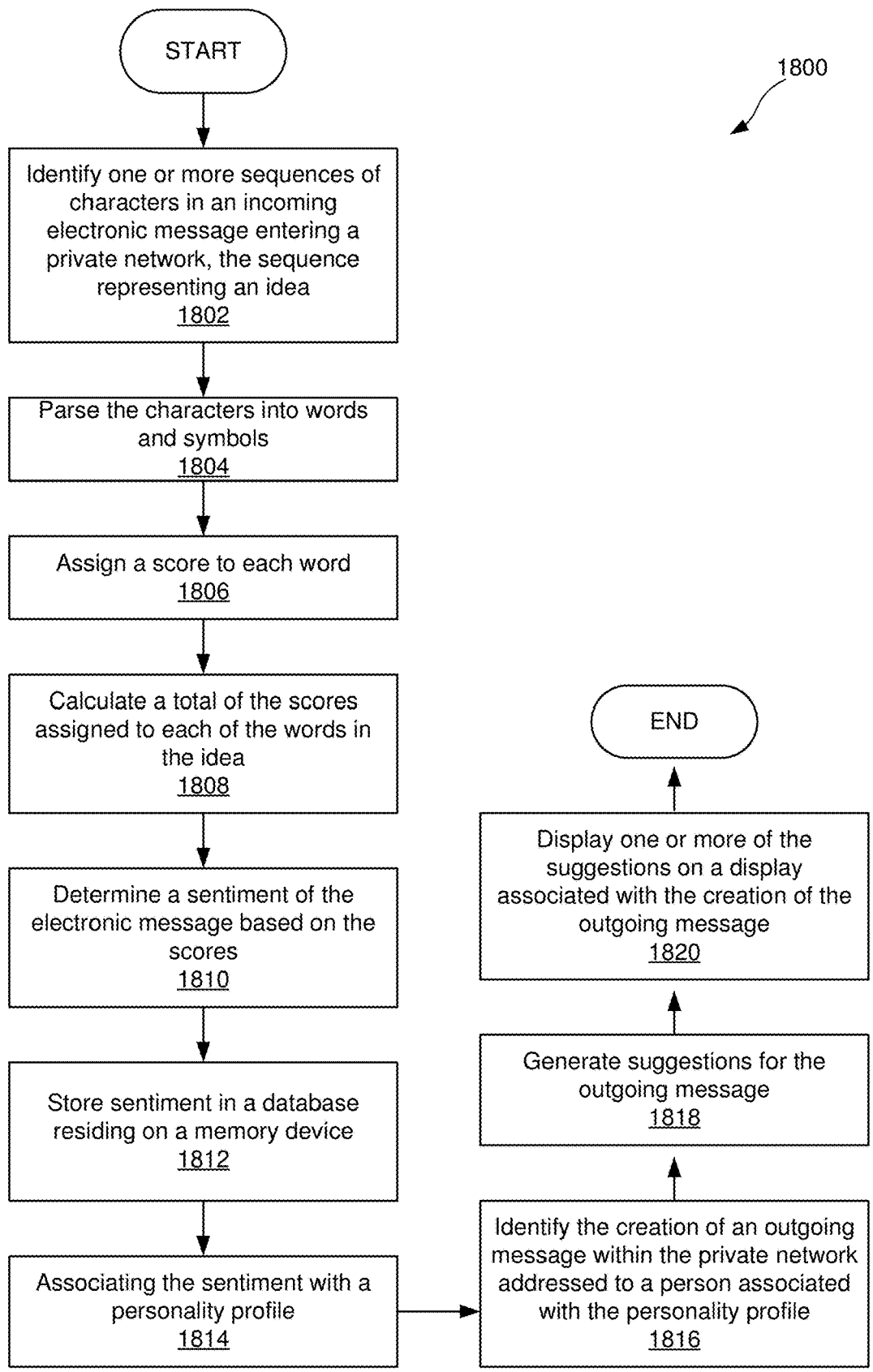
FIG. 18 illustrates a method of generating computer responses to external communications.
Figure 19:
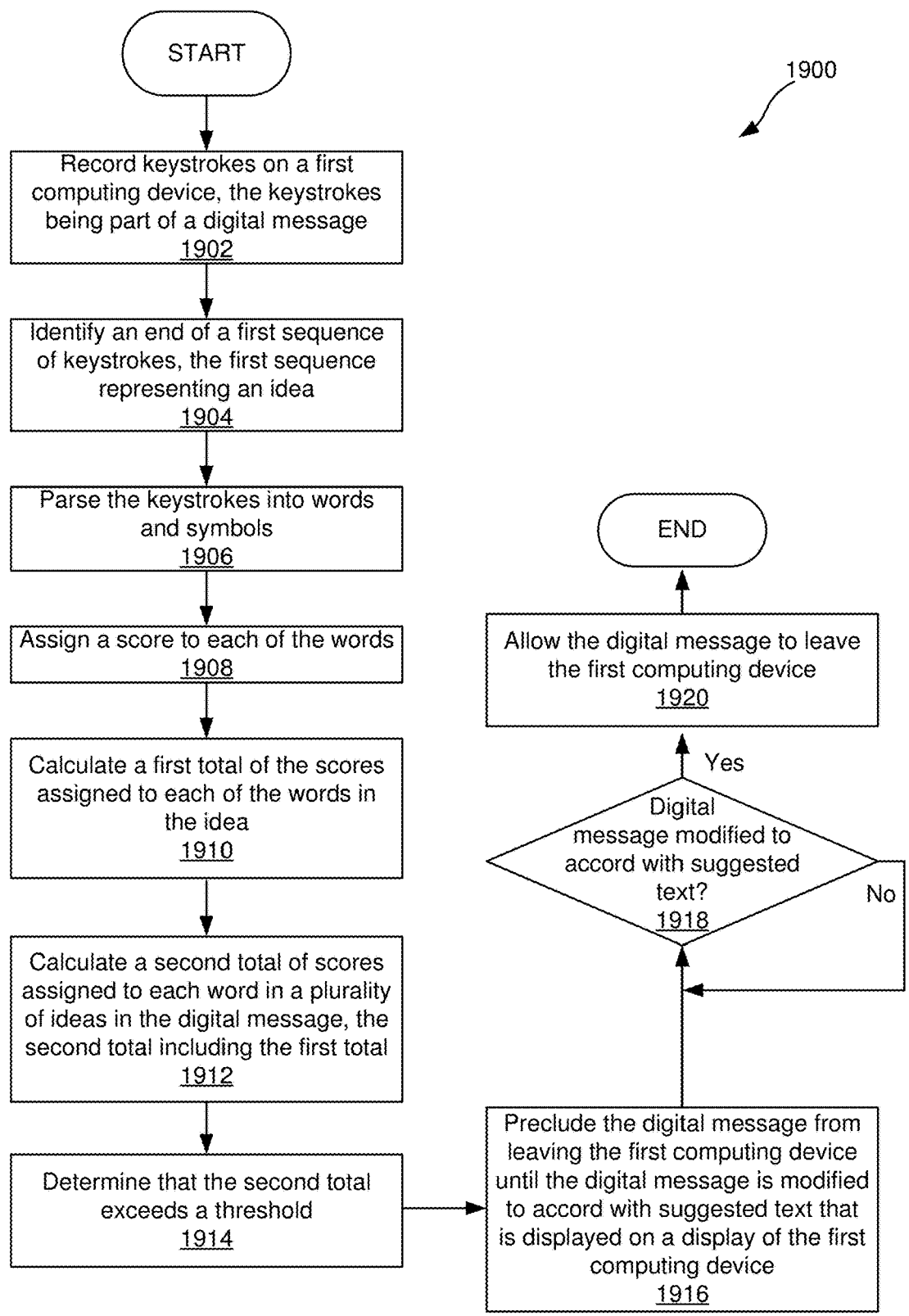
FIG. 19 illustrates another method of generating computer responses to external communications.

The systems and methods described herein can be implemented in a computer system in addition to the specific physical devices described herein. FIG. 17 shows a diagrammatic representation of one embodiment of a computer system 1700 within which a set of instructions can execute for causing a device to perform or execute any one or more of the aspects and/or methodologies of the present disclosure. The computing device described as carrying out the method 100 in FIG. 1 is one implementation of the computer system 1700. The components in FIG. 17 are examples only and do not limit the scope of use or functionality of any hardware, software, firmware, embedded logic component, or a combination of two or more such components implementing particular embodiments of this disclosure. Some or all of the illustrated components can be part of the computer system 1700. For instance, the computer system 1700 can be a general purpose computer (e.g., a laptop computer) or an embedded logic device (e.g., an FPGA), to name just two non-limiting examples.

Computer system 1700 includes at least a processor 1701 such as a central processing unit (CPU) or an FPGA to name two non-limiting examples. A processor of the computing device that carries out the method 100 in FIG. 1 is one implementation of the processor 1701. The computer system 1700 may also comprise a memory 1703 and a storage 1708, both communicating with each other, and with other components, via a bus 1740. The bus 1740 may also link a display 1732, one or more input devices 1733 (which may, for example, include a keypad, a keyboard, a mouse, a stylus, etc.), one or more output devices 1734, one or more storage devices 1735, and various non-transitory, tangible computer-readable storage media 1736 with each other and with one or more of the processor 1701, the memory 1703, and the storage 1708. All of these elements may interface directly or via one or more interfaces or adaptors to the bus 1740. For instance, the various non-transitory, tangible computer-readable storage media 1736 can interface with the bus 1740 via storage medium interface 1726. Computer system 1700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1701 (or central processing unit(s) (CPU(s))) optionally contains a cache memory unit 1702 for temporary local storage of instructions, data, or computer addresses. Processor(s) 1701 are configured to assist in execution of computer-readable instructions stored on at least one non-transitory, tangible computer-readable storage medium. Computer system 1700 may provide functionality as a result of the processor(s) 1701 executing software embodied in one or more non-transitory, tangible computer-readable storage media, such as memory 1703, storage 1708, storage devices 1735, and/or storage medium 1736 (e.g., read only memory (ROM)). For instance, the method 100 in FIG. 1 may be embodied in one or more non-transitory, tangible computer-readable storage media. The non-transitory, tangible computer-readable storage media may store software that implements particular embodiments, such as the method 100, and processor(s) 1701 may execute the software. Memory 1703 may read the software from one or more other non-transitory, tangible computer-readable storage media (such as mass storage device(s) 1735, 1736) or from one or more other sources through a suitable interface, such as network interface 1720. A network interface of the computing device described relative to the method 100, where the network interface carries out at least part of the send digital message operation 106, is one embodiment of the network interface 1720. The software may cause processor(s) 1701 to carry out one or more processes or one or more steps of one or more processes described or illustrated herein. Carrying out such processes or steps may include defining data structures stored in memory 1703 and modifying the data structures as directed by the software. In some embodiments, an FPGA can store instructions for carrying out functionality as described in this disclosure (e.g., the method 100). In other embodiments, firmware includes instructions for carrying out functionality as described in this disclosure (e.g., the method 100).

The memory 1703 may include various components (e.g., non-transitory, tangible computer-readable storage media) including, but not limited to, a random access memory component (e.g., RAM 1704) (e.g., a static RAM "SRAM", a dynamic RAM "DRAM, etc.), a read-only component (e.g., ROM 1705), and any combinations thereof. ROM 1705 may act to communicate data and instructions unidirectionally to processor(s) 1701, and RAM 1704 may act to communicate data and instructions bidirectionally with processor(s) 1701. ROM 1705 and RAM 1704 may include any suitable non-transitory, tangible computer-readable storage media described below. In some instances, ROM 1705 and RAM 1704 include non-transitory, tangible computer-readable storage media for carrying out the method 100. In one example, a basic input/output system 1706 (BIOS), including basic routines that help to transfer information between elements within computer system 1700, such as during start-up, may be stored in the memory 1703.

Fixed storage 1708 is connected bidirectionally to processor(s) 1701, optionally through storage control unit 1707. Fixed storage 1708 provides additional data storage capacity and may also include any suitable non-transitory, tangible computer-readable media described herein. Storage 1708 may be used to store operating system 1709, EXECs 1710 (executables), data 1711, API applications 1712 (application programs), and the like. For instance, the storage 1708 could be implemented for storage of the database of text against which the compliance violation decision 104 and the corrected violation decision 110 compare extracted text as described in FIG. 1. Often, although not always, storage 1708 is a secondary storage medium (such as a hard disk) that is slower than primary storage (e.g., memory 1703). Storage 1708 can also include an optical disk drive, a solid-state memory device (e.g., flash-based systems), or a combination of any of the above. Information in storage 1708 may, in appropriate cases, be incorporated as virtual memory in memory 1703.

In one example, storage device(s) 1735 may be removably interfaced with computer system 1700 (e.g., via an external port connector (not shown)) via a storage device interface 1725. Particularly, storage device(s) 1735 and an associated machine-readable medium may provide nonvolatile and/or volatile storage of machine-readable instructions, data structures, program modules, and/or other data for the computer system 1700. In one example, software may reside, completely or partially, within a machine-readable medium on storage device(s) 1735. In another example, software may reside, completely or partially, within processor(s) 1701.

Bus 1740 connects a wide variety of subsystems. Herein, reference to a bus may encompass one or more digital signal lines serving a common function, where appropriate. Bus 1740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1700 may also include an input device 1733. In one example, a user of computer system 1700 may enter commands and/or other information into computer system 1700 via input device(s) 1733. Examples of an input device(s) 1733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1733 may be interfaced to bus 1740 via any of a variety of input interfaces 1723 (e.g., input interface 1723) including, but not limited to, serial, parallel, game port, USB, FIREWIRE, THUNDERBOLT, or any combination of the above.

In particular embodiments, when computer system 1700 is connected to network 1730 (such as a network over which the digital messages of FIG. 1 are transmitted), computer system 1700 may communicate with other devices, such as mobile devices and enterprise systems, connected to network 1730. Communications to and from computer system 1700 may be sent through network interface 1720. For example, network interface 1720 may receive incoming communications (such as requests or responses from other devices) in the form of one or more packets (such as Internet Protocol (IP) packets) from network 1730, and computer system 1700 may store the incoming communications in memory 1703 for processing. Computer system 1700 may similarly store outgoing communications (such as requests or responses to other devices) in the form of one or more packets in memory 1703 and communicated to network 1730 from network interface 1720. Processor(s) 1701 may access these communication packets stored in memory 1703 for processing.

Examples of the network interface 1720 include, but are not limited to, a network interface card, a modem, and any combination thereof. Examples of a network 1730 or network segment 1730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1730, may employ a wired and/or a wireless mode of communication. In general, any network topology may be used.

Information and data can be displayed through a display 1732. Examples of a display 1732 include, but are not limited to, a liquid crystal display (LCD), an organic liquid crystal display (OLED), a cathode ray tube (CRT), a plasma display, and any combinations thereof. The display 1732 can interface to the processor(s) 1701, memory 1703, and fixed storage 1708, as well as other devices, such as input device(s) 1733, via the bus 1740. The display 1732 is linked to the bus 1740 via a video interface 1722, and transport of data between the display 1732 and the bus 1740 can be controlled via the graphics control 1721.

In addition to a display 1732, computer system 1700 may include one or more other peripheral output devices 1734 including, but not limited to, an audio speaker, a printer, and any combinations thereof. Such peripheral output devices may be connected to the bus 1740 via an output interface 1724. Examples of an output interface 1724 include, but are not limited to, a serial port, a parallel connection, a USB port, a FIREWIRE port, a THUNDERBOLT port, and any combinations thereof.

In addition or as an alternative, computer system 1700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the method 100) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use embodiments of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for enhancing a computerized speed of precluding messages that pose a compliance, policy, or legal violation risk from being recorded in non-volatile memory, the method comprising:
   parsing a first document into words and symbols via a parsing module, sequences of words, or words and symbols, being identified as ideas;
   passing the first document to a semantic analyzer configured to:
   access a policy model stored in a policy engine database;
   access a violation threshold stored in the policy engine database;
   assign a score to each of the ideas using the policy model;
   determine that a total of scores for the first document surpasses the violation threshold; and
   disable save functionality of a device creating the first document, the save functionality configured to save the first document to non-volatile memory.

2. The method of claim 1, further comprising:
providing the first document or a screenshot of the first document to an analytics dashboard configured to present the first document to a policy reviewer;
receiving a response from the policy reviewer indicating the policy reviewer's assessment of risk of the total of the scores for the first document;
storing the response in the policy engine database;
training the policy model, at a training module, using machine learning that uses the response as one of its inputs, to form an enhanced policy model; and
accessing the enhanced policy model and assigning scores to ideas parsed from a second document using the enhanced policy model.

3. The method of claim 2, wherein the analytics dashboard is further configured to provide the first document to a second policy reviewer, the method further comprising:
receiving a second response from the second policy reviewer indicating the second policy reviewer's assessment of risk of the total of the scores for the first document;
storing the second response in the policy engine database; and
training the policy model, at the training module, using the machine learning that uses the second response as a second of its inputs, to form the enhanced policy model.

4. The method of claim 1, wherein the parsing module is part of the semantic analyzer.

5. The method of claim 1, wherein the first document is received in real time as it is created.

6. The method of claim 1, wherein the first document is received via import after document creation.

7. The method of claim 1, wherein the semantic analyzer further provides the total of scores for the first document to the analytics dashboard.

8. The method of claim 1, wherein the semantic analyzer requests the screenshot from a device creating the first document in response to determining that the total of scores for the first document surpasses the violation threshold.

9. A system for enhancing a computerized speed of precluding messages that pose a compliance, policy, or legal violation risk from being recorded in non-volatile memory during document creation, the system comprising:
a parsing module configured to receive a document in real time or via import and parsing the document into words and symbols sequences of words, or words and symbols, being identified as ideas;
a policy engine database;
an analytics dashboard configured to present the document, or a screenshot of the document, to a policy reviewer, and to receive a response from the policy reviewer indicating the policy reviewer's assessment of risk of a total of scores assigned to the document;
a semantic analyzer configured to:
receive the sequences of words, or words and symbols;
access a policy model stored in the policy engine database;
access a violation threshold stored in the policy engine database;
assign a score to each of the ideas using the policy model;
determine that the total of the scores assigned to the document surpasses the violation threshold; and
disable save functionality of a device creating the document, the save functionality configured to save the document to non-volatile memory.

10. The system of claim 9, wherein the semantic analyzer is further configured to provide the document or the screenshot of the document to the analytics dashboard, and wherein the system further comprises a training module configured to train the policy model using the response from the policy reviewer as one of its inputs, to form an enhanced policy model.

11. The system of claim 10, wherein the semantic analyzer is further configured to provide the total of the scores assigned to the document to the analytics dashboard.

12. The system of claim 10, wherein the analytics dashboard is further configured to:
provide the document to a second policy reviewer;
receive a second response from the second policy reviewer indicating the second policy reviewer's assessment of risk of the total of the scores assigned to the document;
store the second response in the policy engine database; and
wherein the training module is further configured to train the policy model, using the second response as a second of its inputs, to form the enhanced policy model.

13. The system of claim 9, wherein the parsing module is part of the semantic analyzer.

14. The system of claim 9, wherein the semantic analyzer is further configured to request the screenshot from a device creating the document in response to determining that the total of scores assigned to the document surpasses the violation threshold.

15. A non-transitory, tangible computer readable storage medium, encoded with processor readable instructions to perform a method of enhancing a computerized speed of precluding messages that pose a compliance, policy, or legal violation risk from being recorded in non-volatile memory during document creation, the method comprising:
parsing a first document into words and symbols via a parsing module, sequences of words, or words and symbols, being identified as ideas;
passing the first document to a semantic analyzer configured to:
access a policy model stored in a policy engine database;
access a violation threshold stored in the policy engine database;
assign a score to each of the ideas using the policy model;
determine that a total of scores for the first document surpasses the violation threshold; and
disable save functionality of a device creating the first document, the save functionality configured to save the first document to non-volatile memory.

16. The non-transitory, tangible computer readable storage medium of claim 15, further comprising:
providing the first document or a screenshot of the first document to an analytics dashboard configured to present the first document to a policy reviewer;
receiving a response from the policy reviewer indicating the policy reviewer's assessment of risk of the total of the scores for the first document;
storing the response in the policy engine database;
training the policy model, at a training module, using machine learning that uses the response as one of its inputs, to form an enhanced policy model; and
accessing the enhanced policy model and assigning scores to ideas parsed from a second document using the enhanced policy model.

17. The non-transitory, tangible computer readable storage medium of claim 16, wherein the analytics dashboard is further configured to provide the first document to a second policy reviewer, the method further comprising:
- receiving a second response from the second policy reviewer indicating the second policy reviewer's assessment of risk of the total of the scores for the first document;
- storing the second response in the policy engine database; and
- training the policy model, at the training module, using machine learning that uses the second response as a second of its inputs, to form the enhanced policy model.

18. The non-transitory, tangible computer readable storage medium of claim 15, wherein the parsing module is part of the semantic analyzer.

19. The non-transitory, tangible computer readable storage medium of claim 15, wherein the first document is received in real time as it is created.

20. The non-transitory, tangible computer readable storage medium of claim 15, wherein the first document is received via import after first document creation.

21. The non-transitory, tangible computer readable storage medium of claim 15, wherein the semantic analyzer further provides the total of scores for the first document to the analytics dashboard.

22. The non-transitory, tangible computer readable storage medium of claim 15, wherein the semantic analyzer requests the screenshot from a device creating the first document in response to determining that the total of scores for the first document surpasses the violation threshold.

\* \* \* \* \*